(12) United States Patent
Du et al.

(10) Patent No.: US 12,130,860 B2
(45) Date of Patent: Oct. 29, 2024

(54) VISUAL FEATURE DATABASE CONSTRUCTION METHOD, VISUAL POSITIONING METHOD AND APPARATUS, AND STORAGE MEDIUM

(71) Applicant: HUAWEI TECHNOLOGIES CO., LTD., Shenzhen (CN)

(72) Inventors: Siliang Du, Wuhan (CN); Zehui Kang, Beijing (CN); Wei Fang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 481 days.

(21) Appl. No.: 17/665,793

(22) Filed: Feb. 7, 2022

(65) Prior Publication Data
US 2022/0156968 A1    May 19, 2022

Related U.S. Application Data

(63) Continuation of application No. PCT/CN2020/107597, filed on Aug. 7, 2020.

(30) Foreign Application Priority Data

Aug. 9, 2019  (CN) .......................... 201910736102.2

(51) Int. Cl.
   *G06T 7/10*     (2017.01)
   *G06F 16/583*   (2019.01)
   (Continued)

(52) U.S. Cl.
   CPC .............. *G06F 16/583* (2019.01); *G06T 7/10* (2017.01); *G06T 7/73* (2017.01); *G06T 17/00* (2013.01);
   (Continued)

(58) Field of Classification Search
   None
   See application file for complete search history.

(56) References Cited

U.S. PATENT DOCUMENTS 8,791,996 B2 *   7/2014  Miyajima ............... G06F 18/28
                                                    348/148
2008/0247635 A1  10/2008  Davis et al.
(Continued)

FOREIGN PATENT DOCUMENTS

CN      102075686 A     5/2011
CN      102867057 A     1/2013
(Continued)

OTHER PUBLICATIONS

Paul-Edouard Sarlin et al, From Coarse to Fine: Robust Hierarchical Localization at Large Scale, 2019 IEEE/CVF Conference on Computer Vision and Pattern Recognition (CVPR), total 10 pages.
(Continued)

*Primary Examiner* — Dov Popovici
(74) *Attorney, Agent, or Firm* — Rimon PC

(57) ABSTRACT

This application provides a visual feature database construction method, including: obtaining a database creation image; performing feature extraction on the database creation image to obtain a feature point of the database creation image and a descriptor of the feature point of the database creation image; intersecting a ray corresponding to the feature point of the database creation image with a 3D model, to determine the 3D position of the intersection point at which the ray intersects with the 3D model as the 3D position of the feature point of the database creation image; and writing the descriptor of the feature point of the database creation image and the database creation image into a visual feature database, to construct the visual feature database.

20 Claims, 13 Drawing Sheets

(51) Int. Cl.
    *G06T 7/73*    (2017.01)
    *G06T 17/00*    (2006.01)
    *G06V 10/40*    (2022.01)
    *G06V 10/74*    (2022.01)
    *G06V 20/64*    (2022.01)

(52) U.S. Cl.
    CPC .............. *G06V 10/40* (2022.01); *G06V 10/74* (2022.01); *G06V 20/64* (2022.01); *G06T 2207/10028* (2013.01)

(56) References Cited

U.S. PATENT DOCUMENTS

| | | | | |
|---|---|---|---|---|
| 2016/0005142 A1* | 1/2016 | Shen | ................... | G06V 10/772 345/419 |
| 2018/0253108 A1 | 9/2018 | Heinla et al. | | |
| 2023/0152084 A1* | 5/2023 | Fang | ................... | G06V 40/103 348/135 |

FOREIGN PATENT DOCUMENTS

| | | |
|---|---|---|
| CN | 103954970 A | 7/2014 |
| CN | 105225240 A | 1/2016 |
| CN | 105389569 A | 3/2016 |
| CN | 105674993 A | 6/2016 |
| CN | 106447585 A | 2/2017 |
| CN | 107741234 A | 2/2018 |
| CN | 107742311 A | 2/2018 |
| CN | 107909612 A | 4/2018 |
| CN | 108109164 A | 6/2018 |
| CN | 108428254 A | 8/2018 |
| WO | 2018184108 A1 | 10/2018 |

OTHER PUBLICATIONS

Torsten Sattler et al, Benchmarking 6DOF Outdoor Visual Localization in Changing Conditions, 2018 IEEE/CVF Conference on Computer Vision and Pattern Recognition (CVPR), total 10 pages.

\* cited by examiner

VISUAL FEATURE DATABASE CONSTRUCTION METHOD, VISUAL POSITIONING METHOD AND APPARATUS, AND STORAGE MEDIUM

CROSS-REFERENCE TO RELATED APPLICATIONS

This application is a continuation of International Application No. PCT/CN2020/107597, filed on Aug. 7, 2020, which claims priority to Chinese Patent Application No. 201910736102.2, filed on Aug. 9, 2019. The disclosures of the aforementioned applications are hereby incorporated by reference in their entireties.

TECHNICAL FIELD

This application relates to the visual positioning field, and more specifically, to a visual feature database construction method, a visual positioning method and apparatus, and a storage medium.

BACKGROUND

Visual positioning is widely used in various fields, such as autonomous driving and augmented reality. Visual positioning usually uses a pre-established visual feature database to extrapolate position and posture information of a camera through a single image taken by the camera.

To achieve more accurate visual positioning, a visual feature database including sufficient information usually needs to be constructed. In a conventional solution, feature extraction and feature matching are usually performed on a captured image, a descriptor and a three-dimensional (3D) position of a matching feature point are obtained, and the descriptor and the 3D position of the matching feature point are saved in the visual feature database.

In the conventional solution, feature matching needs to be first performed when the visual feature database is constructed, and only information about a successfully matched feature point in the captured image can be saved in the visual feature database. In this way, in the conventional solution, when the quantity of database creation images is fixed, only information about a relatively small quantity of feature points can be gathered from these images, and therefore there is comparatively a small amount of information about feature points of the images in the finally constructed visual feature database.

SUMMARY

This application provides a visual feature database construction method, a visual positioning method and apparatus, and a storage medium. By intersecting a ray corresponding to a feature point of a database creation image with a 3D model, when the quantity of database creation images is fixed, information about a larger quantity of feature points can be extracted from the database creation images, so that the constructed visual feature database includes the information about the larger quantity of feature points of the database creation images. Therefore, visual positioning can be better performed subsequently based on the visual feature database.

According to a first aspect, a visual feature database construction method is provided. The method includes: obtaining a database creation image; performing feature extraction on the database creation image to obtain a feature point of the database creation image and a descriptor of the feature point of the database creation image; intersecting a ray corresponding to the feature point of the database creation image with a 3D model to determine a 3D position of the feature point of the database creation image; and constructing a visual feature database, where the visual feature database includes the descriptor of the feature point of the database creation image and the 3D position of the feature point of the database creation image.

The 3D position of the feature point of the database creation image is the 3D position of the intersection point at which the ray intersects with the 3D model, and the ray corresponding to the feature point of the database creation image is a ray that starts from a projection center of the database creation image and passes through the feature point of the database creation image.

Optionally, the database creation image and the 3D model are located in the same coordinate system, and the projection center of the database creation image is the position of a first photographing unit when the first photographing unit photographs the database creation image.

The database creation image and the 3D model may be located in the same world coordinate system.

The first photographing unit is a photographing unit for photographing the database creation image, and the first photographing unit may be a camera lens.

The foregoing database creation image may be one image or a plurality of images.

The database creation image is obtained photographically by using a camera or another image photographing device, and the database creation image is used to construct the visual feature database.

The database creation image may be a panoramic image, a wide-angle image, or the like.

Optionally, the obtaining a database creation image includes: obtaining the database creation image from a camera or another image photographing device.

When the database creation image is photographed by a camera or another image photographing device, a communication connection (which may be wired communication or wireless communication) may be established with the camera or the image photographing device, to obtain the database creation image.

It should be understood that the feature of a database creation image includes a plurality of feature points.

In this application, the 3D position of the feature point of the database creation image is obtained by intersecting the ray with the 3D model. Compared with a conventional solution in which only a 3D position of a matched feature point between images can be obtained, when the quantity of database creation images is fixed, information about a larger quantity of feature points is obtained from the database creation images, so that a constructed visual feature database includes the information about the larger quantity of feature points.

Further, when the quantity of database creation images is fixed, the visual feature database constructed according to this application includes the information about the larger quantity of feature points, so that a better visual positioning effect is obtained when the visual feature database is subsequently used to perform visual positioning.

In addition, when the quantity of database creation images is fixed, the visual feature database constructed according to the visual feature database construction method in this application includes the information about the larger quantity of feature points. Therefore, the visual feature database construction method in this application can be applied to scenarios, such as a relatively large radiation difference and a weak texture, in which accurate visual positioning is difficult to perform. In these scenarios, visual positioning can be performed based the visual feature database obtained using the visual feature database construction method in this embodiment of this application to obtain a better visual positioning effect.

With reference to the first aspect, in some implementations of the first aspect, the performing feature extraction on the database creation image, to obtain a feature point of the database creation image and a descriptor of the feature point of the database creation image includes: performing feature extraction on the database creation image by using a feature extraction algorithm, to obtain the feature point of the database creation image and the descriptor of the feature point of the database creation image.

The feature extraction algorithm is an algorithm used to extract a feature point of a database creation image and a descriptor of the feature point of the database creation image.

Specifically, when feature extraction is performed on a database creation image, one or more types of the following feature extraction algorithms may be used:
  an oriented FAST and rotated BRIEF (ORB) algorithm, which is a fast feature point extraction and description algorithm;
  a scale-invariant feature transform (SIFT) algorithm;
  a SuperPoint algorithm;
  a D2-Net algorithm, which is a feature extraction algorithm proposed in the paper (A Trainable CNN for Joint Detection and Description of Local Features, Chinese translation: a trainable CNN for joint detection and description of local features, where the CNN represents a convolutional neural network); and
  a line feature algorithm.

The feature extraction algorithm may be referred to as a feature extraction operator.

It should be understood that when feature extraction is performed on a database creation image by using a plurality of types of feature extraction algorithms, a plurality of types of feature points of the database creation image and descriptors of the feature points of the database creation image can be extracted.

In this application, when feature extraction is performed on the database creation image by using the plurality of types of feature extraction algorithms, more types of feature points and descriptors of the feature points can be obtained from the database creation image, so that a finally constructed visual feature database can include more types of feature points, and the effectiveness of subsequently performing visual positioning based on the visual feature database can be improved.

With reference to the first aspect, in some implementations of the first aspect, the visual feature database further includes semantic information of the feature point of the database creation image and a confidence degree of the semantic information of the feature point of the database creation image.

The semantic information of the feature point of the database creation image is the same as the semantic information of the region in which the feature point of the database creation image is located, the confidence degree of the semantic information of the feature point of the database creation image is the same as the confidence degree of the semantic information of the region in which the feature point of the database creation image is located, and semantic information of each region of the database creation image and the confidence degree of the semantic information of each region are obtained by performing semantic segmentation on the database creation image.

The semantic information may include a pedestrian, a road, a vehicle, a tree, a building, sky, glass, and the like. When the database creation image is an indoor image, the semantic information may further include furniture, an electrical appliance, and the like.

The confidence degree of the semantic information may be referred to as a trustworthiness degree of the semantic information.

In this application, when the visual feature database includes the semantic information of the feature point of the database creation image and the confidence degree of the semantic information of the feature point of the database creation image, semantic information and confidence degrees corresponding to different feature points can be considered during subsequent visual positioning, to determine the importance degrees of the different feature points during visual positioning, so that more precise visual positioning can be performed, and accuracy of visual positioning can be improved.

With reference to the first aspect, in some implementations of the first aspect, the visual feature database further includes a descriptor of the database creation image, and the descriptor of the database creation image is obtained by synthesizing the descriptor of the feature point of the database creation image.

Because the feature point of the database creation image may be a plurality of feature points, the synthesizing the descriptor of the feature point of the database creation image is actually synthesizing descriptors of the plurality of feature points in the database creation image.

The descriptor of the feature point of the database creation image may be referred to as a local descriptor, and the descriptor of the database creation image may be referred to as a global descriptor.

In this application, when the visual feature database includes the descriptor of the database creation image, a process of determining a matching feature point can be improved during subsequent visual positioning, and a process of visual positioning can be accelerated.

Specifically, when the visual feature database includes the descriptor of the database creation image, and when visual positioning is performed based on the visual feature database, N (N is a positive integer) images whose descriptors are relatively close are first coarsely selected from the visual feature database based on a descriptor of a to-be-processed image, and then a matching feature point of a feature point of the to-be-processed image is determined from feature points of the N images, so that a visual positioning process can be accelerated, and visual positioning efficiency can be improved.

With reference to the first aspect, in some implementations of the first aspect, the performing feature extraction on the database creation image, to obtain a feature point of the database creation image and a descriptor of the feature point of the database creation image includes: performing scene simulation on the database creation image, to generate scene images in a plurality of scenarios; and performing feature extraction on the scene images in the plurality of scenarios, to obtain the feature point of the database creation image and the descriptor of the feature point of the database creation image.

Optionally, the plurality of scenarios includes at least two of daytime, night, rainy day, snowy day, and cloudy day.

Optionally, lighting conditions of the foregoing plurality of scenarios are different.

In other words, for the foregoing plurality of scenarios, the lighting condition of each scenario may be different from the lighting condition of another scenario. In addition, different lighting conditions may specifically refer to different lighting intensities.

The scene images in the plurality of scenarios may also be referred to as a plurality types of scene images, and each type of scene image is obtained by performing scene simulation on the database creation image.

In this application, scene simulation is performed on the database creation image, and then feature extraction is performed on the plurality of types of scene images obtained after scene simulation, so that a finally constructed visual feature database includes information about feature points extracted from different scene images, and information included in the visual feature database is richer. Therefore, more effective visual positioning can be performed subsequently based on the visual feature database.

Specifically, during visual positioning, if the visual feature database includes feature points of the plurality of types of scene images, a target scene image that is the closest to a scene when the to-be-processed image is photographed may be first determined from the plurality of types of scene images, and then the matching feature point of the feature point of the to-be-processed image is determined from the target scene image, so that a more accurate matching feature point can be determined for the feature point of the to-be-processed image, thereby improving the success rate of visual positioning.

With reference to the first aspect, in some implementations of the first aspect, the performing feature extraction on the database creation image, to obtain a feature point of the database creation image and a descriptor of the feature point of the database creation image includes: performing segmentation processing on the database creation image to obtain a plurality of slice images; and performing feature extraction on the plurality of slice images, to obtain the feature point of the database creation image and the descriptor of the feature point of the database creation image.

Partial image content of adjacent slice images is the same in the plurality of slice images, and the database creation image may be a panoramic image.

When the database creation image is the panoramic image, the panoramic image is segmented, and feature extraction is performed on the slice images obtained through segmentation, so that the matching feature point of the feature point of the to-be-processed image (an image on which visual positioning needs to be performed) can be relatively accurately determined during subsequent visual positioning, thereby improving accuracy of visual positioning.

Specifically, when the database creation image is the panoramic image, because an imaging manner of panoramic projection is different from an imaging manner of an image photographed by a user, slice images with different angles of view can be obtained by performing segmentation processing on the database creation image. Therefore, the difference between the imaging manner of the database creation image and the imaging manner of the image photographed by the user is eliminated, so that when visual positioning is performed on the image photographed by the user based on the visual feature database, a matching feature point of a feature point of the image photographed by the user can be more accurately determined.

With reference to the first aspect, in some implementations of the first aspect, the method further includes: receiving a to-be-processed image from user equipment; performing feature extraction on the to-be-processed image, to obtain a feature point of the to-be-processed image and a descriptor of the feature point of the to-be-processed image; intersecting a ray corresponding to the feature point of the to-be-processed image with the 3D model, to determine a 3D position of the feature point of the to-be-processed image; and updating the visual feature database, where the updated visual feature database includes the feature point of the to-be-processed image and the 3D position of the feature point of the to-be-processed image.

The 3D position of the feature point of the to-be-processed image is the 3D position of the intersection point at which a ray corresponding to the feature point of the to-be-processed image intersects with the 3D model, and the ray corresponding to the feature point of the to-be-processed image is a ray that starts from a projection center of the to-be-processed image and passes through the feature point of the to-be-processed image.

Optionally, the to-be-processed image and the 3D model are located in the same coordinate system, and the projection center of the to-be-processed image is the position of a second photographing unit when the second photographing unit photographs the to-be-processed image.

The to-be-processed image may be an image photographed by the user equipment. The to-be-processed image and the 3D model may be located in the same world coordinate system.

In addition, the second photographing unit is a photographing unit for photographing the database creation image, and the second photographing unit may be specifically a camera lens.

In this application, the to-be-processed image from the user equipment is obtained, and the visual feature database is updated after the 3D position of the feature point of the to-be-processed image is determined, so that information included in the updated visual feature database is more real-time.

With reference to the first aspect, in some implementations of the first aspect, before the updating the visual feature database, the method further includes: determining that semantic information of the to-be-processed image is different from semantic information of a reference image, where the reference image is an image, in the visual feature database, that is closest to a position of the to-be-processed image.

In this application, when the semantic information of the reference image in the visual feature database is different from the semantic information of the to-be-processed image in the visual feature database, it indicates that the image content of an object corresponding to the to-be-processed image may have changed. In this case, the visual feature database is updated, the visual feature database can be updated in time when semantic information reflected by image information is not accurate enough, and the visual feature database is more real time.

With reference to the first aspect, in some implementations of the first aspect, the method further includes: obtaining modeling data, where the modeling data includes a modeling image and point cloud data; performing feature extraction on the modeling image to obtain a feature point of the modeling image; performing feature matching on feature points of any one image in the database creation image and any one image in the modeling image, and stringing matched feature points, to obtain a feature point sequence with the same name; performing adjustment processing on the database creation image and the modeling image according to the feature point sequence with the same name, to obtain a posture of the database creation image and a posture of the modeling image; and constructing the 3D model based on the posture of the modeling image and the point cloud data.

The matched feature points are feature points corresponding to the same place in the real world in different images. The stringing the matched feature points may be specifically connecting the feature points that are in the database creation image and the modeling image and that are corresponding to the same place in the real world, to obtain a sequence (a feature point sequence with the same name) obtained by connecting the plurality of feature points.

After the feature point sequence with the same name is obtained, position correction may be performed on the feature point in the database creation image and the feature point in the modeling image according to the feature point sequence with the same name and a preset control point, so that the obtained posture of the database creation image and the obtained posture of the modeling image are more accurate. This facilitates subsequent construction of a more accurate visual feature database.

The modeling image may be an image photographed by an unmanned aerial vehicle (a modeling image can be photographed by the unmanned aerial vehicle in an outdoor environment), or may be an image obtained by scanning (a modeling image can be scanned by a scanner in an indoor environment). The modeling image is an image used to establish a 3D model.

In this application, adjustment processing is performed on the database creation image and the modeling image, so that the database creation image and the modeling image are aligned, and the 3D position of the feature point of the database creation image in the visual feature database is more accurate. This facilitates more accurate positioning performed subsequently based on the visual feature database.

With reference to the first aspect, in some implementations of the first aspect, the database creation image is a panoramic image.

When the database creation image is a panoramic image, the database creation image includes more information, and more feature points can be extracted from the database creation image in a process of constructing the visual feature database.

When feature extraction is performed on the database creation image, scene simulation may be first performed on the database creation image, to obtain scene images in a plurality of scenarios, and then segmentation processing is performed on a scene image in each scenario (certainly, segmentation processing may also be performed only on some of the scene images) to obtain a plurality of slice images.

With reference to the first aspect, in some implementations of the first aspect, the performing feature extraction on the database creation image, to obtain a feature point of the database creation image and a descriptor of the feature point of the database creation image includes: performing scene simulation on the database creation image, to obtain scene images in a plurality of scenarios; separately performing segmentation processing on the scene images in the plurality of scenarios, to obtain a plurality of slice images; and performing feature extraction on the plurality of slice images, to obtain the feature point of the database creation image and the descriptor of the feature point of the database creation image.

The plurality of scenarios includes at least two of daytime, night, rainy day, snowy day, and cloudy day. Partial image content of adjacent slice images is the same in the plurality of slice images.

For example, assume that scene simulation is performed on the database creation image, to obtain scene images in three scenarios: a first scene image, a second scene image, and a third scene image. Next, segmentation processing is separately performed on the first scene image, the second scene image, and the third scene image, to obtain a plurality of slice images. Assuming that each scene image is segmented to obtain eight slice images, segmentation processing is separately performed on the first scene image, the second scene image, and the third scene image to obtain 24 slice images, and then feature extraction is performed on the 24 slice images. Therefore, the feature point of the database creation image and the descriptor are obtained.

When feature extraction is performed on the database creation image, segmentation processing may also be first performed on the database creation image to obtain slice images, and then scene simulation is performed on each slice image (certainly, scene simulation may also be performed on some of the slice images).

With reference to the first aspect, in some implementations of the first aspect, the performing feature extraction on the database creation image, to obtain a feature point of the database creation image and a descriptor of the feature point of the database creation image includes: performing segmentation processing on the database creation image to obtain a plurality of slice images; performing scene simulation on each of the plurality of slice images, to obtain scene images in a plurality of scenarios; and performing feature extraction on the scene images in the plurality of scenarios, to obtain the feature point of the database creation image and the descriptor of the feature point of the database creation image.

Partial image content of adjacent slice images is the same in the plurality of slice images, and the plurality of scenarios includes at least two of daytime, night, rainy day, snow day, and cloudy day.

For example, assume that segmentation processing is performed on the database creation image to obtain eight slice images, and then scene simulation is performed on the eight slice images. Assuming that scene simulation is performed on each slice image to obtain scene images in four scenarios, scene simulation is separately performed on the eight slice images to obtain 32 scene images, and then feature extraction is performed on the 32 scene images. Therefore, the feature point of the database creation image and the descriptor are obtained.

The performing feature extraction on the database creation image by using the plurality of types of feature extraction algorithms may include: first performing segmentation processing and/or scene simulation on the database creation image, and then performing feature extraction on the obtained images, to obtain the feature point of the database creation image and the descriptor of the feature point of the database creation image.

With reference to the first aspect, in some implementations of the first aspect, the performing feature extraction on the database creation image, to obtain a feature point of the database creation image and a descriptor of the feature point of the database creation image includes: performing segmentation processing on the database creation image to obtain a plurality of slice images; and performing feature extraction on each of the plurality of slice images by using the plurality of types of feature extraction algorithms, to obtain the feature point of the database creation image and the descriptor of the feature point of the database creation image.

Parts of the image content of adjacent slice images are the same in the plurality of slice images.

For example, segmentation processing is performed on the database creation image to obtain 12 slice images, and then feature extraction is performed on each of the 12 slice images by using three types of feature extraction algorithms. Therefore, the feature point of the database creation image and the descriptor of the feature point of the database creation image are obtained.

With reference to the first aspect, in some implementation of the first aspect, the performing feature extraction on the database creation image, to obtain a feature point of the database creation image and a descriptor of the feature point of the database creation image includes: performing scene simulation on the database creation image, to generate scene images in a plurality of scenarios; and separately performing feature extraction on the scene images by using the plurality of types of feature extraction algorithms, to obtain the feature point of the database creation image and the descriptor of the feature point of the database creation image.

The plurality of scenarios includes at least two of daytime, night, rainy day, snowy day, and cloudy day.

For example, scene simulation is performed on the database creation image to obtain scene images in four scenarios. Next, feature extraction is separately performed on scene images in the four scenarios by using three types of feature extraction algorithms. Therefore, the feature point of the database creation image and the descriptor of the feature point of the database creation image are obtained.

With reference to the first aspect, in some implementations of the first aspect, the performing feature extraction on the database creation image, to obtain a feature point of the database creation image and a descriptor of the feature point of the database creation image includes: performing scene simulation on the database creation image, to obtain scene images in a plurality of scenarios; separately performing segmentation processing on the scene images in the plurality of scenarios, to obtain a plurality of slice images; and separately performing feature extraction on the plurality of slice images by using the plurality of types of feature extraction algorithms, to obtain the feature point of the database creation image and the descriptor of the feature point of the database creation image.

The plurality of scenarios includes at least two of daytime, night, rainy day, snowy day, and cloudy day. Parts of the image content of adjacent slice images are the same in the plurality of slice images.

For example, scene simulation is performed on the database creation image, to obtain scene images in three scenarios: a first scene image, a second scene image, and a third scene image. Next, segmentation processing is separately performed on the first scene image, the second scene image, and the third scene image. Each scene image is segmented to obtain eight slice images. In this case, segmentation processing is separately performed on the first scene image, the second scene image, and the third scene image, to obtain 24 slice images. Then, feature extraction is separately performed on the 24 slice images by using three types of feature extraction algorithms. Therefore, the feature point of the database creation image and the descriptor are obtained.

With reference to the first aspect, in some implementations of the first aspect, the performing feature extraction on the database creation image, to obtain a feature point of the database creation image and a descriptor of the feature point of the database creation image includes: performing segmentation processing on the database creation image to obtain a plurality of slice images; performing scene simulation on each of the plurality of slice images, to obtain scene images in a plurality of scenarios; and separately performing feature extraction on the scene images in the plurality of scenarios by using the plurality of types of feature extraction algorithms, to obtain the feature point of the database creation image and the descriptor of the feature point of the database creation image.

Parts of the image content of adjacent slice images are the same in the plurality of slice images, and the plurality of scenarios includes at least two of daytime, night, rainy day, snow day, and cloudy day.

For example, segmentation processing is performed on the database creation image to obtain eight slice images, scene simulation is performed on each of the eight slice images to obtain scene images in four scenarios, to obtain 32 images in total, and then feature extraction is separately performed on the 32 images by using three types of feature extraction algorithms. Therefore, the feature point of the database creation image and the descriptor are obtained.

According to a second aspect, a visual positioning method is provided. The method includes: obtaining a to-be-processed image; performing feature extraction on the to-be-processed image, to obtain a feature point of the to-be-processed image and a descriptor of the feature point of the to-be-processed image; determining a matching feature point of the feature point of the to-be-processed image from a visual feature database based on the descriptor of the feature point of the to-be-processed image; and determining, based on a 3D position of the matching feature point, posture information of a photographing unit when the photographing unit photographs the to-be-processed image.

The visual feature database includes a descriptor of a feature point of a database creation image and a 3D position of the feature point of the database creation image, and the visual feature database meets at least one of the following conditions:
  the feature point of the database creation image includes a plurality of groups of feature points, and descriptors of any two of the plurality of groups of feature points have different description manners;
  the visual feature database includes a descriptor of the database creation image, and the descriptor of the database creation image is obtained by synthesizing the descriptor of the feature point of the database creation image;
  the feature point of the database creation image is feature points of a plurality of types of scene images, the plurality of types of scene images are obtained by performing scene simulation on the database creation image, and the plurality of scenarios includes at least two of daytime, night, rainy day, snowy day, and cloudy day;
  the feature point of the database creation image and the descriptor of the feature point of the database creation image are obtained by performing feature extraction on a plurality of slice images, the plurality of slice images are obtained by performing segmentation processing on the database creation image, and parts of the image content of adjacent slice images are the same in the plurality of slice images; and
  the visual feature database includes semantic information of the feature point of the database creation image and a confidence degree of the semantic information of the feature point of the database creation image.

Compared with a visual feature database in a conventional solution, the visual feature database in this application includes more information. Therefore, in this application, visual positioning can be better performed based on the visual feature database, thereby improving the visual positioning effectiveness.

Specifically, because the visual feature database in this application includes more information, when visual positioning is performed on the to-be-processed image based on the visual feature database, the matching feature point of the feature point of the to-be-processed image can be more accurately determined, and more accurate positioning of the to-be-processed image can be implemented.

The visual feature database in the second aspect may be constructed according to the visual feature database construction method in the first aspect.

The foregoing plurality of groups of feature points and descriptors of the plurality of groups of feature points may be obtained by performing feature extraction on the database creation image by using a plurality of types of feature extraction algorithms. The plurality of types of feature extraction algorithms may be any two of an ORB algorithm, an SIFT algorithm, a SuperPoint algorithm, a D2-net algorithm, and a line feature.

When the visual feature database includes the plurality of groups of feature points, the visual feature database includes more related information about the feature point. This facilitates better visual positioning based on the visual feature database subsequently.

The descriptor of the database creation image may be a descriptor for describing an overall feature of the database creation image, and the descriptor of the database creation image may be obtained by synthesizing the descriptor of the feature point of the database creation image in a process of constructing the visual feature database. The feature point of the database creation image herein may refer to all feature points extracted from the database creation image.

With reference to the second aspect, in some implementations of the second aspect, that the feature point of the database creation image includes a plurality of groups of feature points and the determining a matching feature point of the feature point of the to-be-processed image from a visual feature database based on the descriptor of the feature point of the to-be-processed image includes: determining a target group of feature points from the plurality of groups of feature points based on a description manner of the descriptor of the feature point of the to-be-processed image; and determining the matching feature point of the feature point of the to-be-processed image from the target group of feature points based on the descriptor of the feature point of the to-be-processed image.

The target group of feature points is a group of feature points, in the plurality of groups of feature points, whose description manner of the descriptor is the same as that of the descriptor of the feature point of the to-be-processed image.

When the feature point of the database creation image includes the plurality of groups of feature points, the visual feature database includes more information about the feature point, and a target group of feature points whose description manner is the same as that of the descriptor of the feature point of the to-be-processed image is selected from the plurality of groups of feature points. A matching feature point that better matches the feature point of the to-be-processed image can be subsequently selected from the target group of feature points, thereby improving the visual positioning effectiveness.

With reference to the second aspect, in some implementations of the second aspect, that the visual feature database includes a descriptor of the database creation image and the determining a matching feature point of the feature point of the to-be-processed image from a visual feature database based on the descriptor of the feature point of the to-be-processed image includes: determining N images from the database creation image based on a descriptor of the to-be-processed image; and determining the matching feature point of the feature point of the to-be-processed image from feature points of the N images.

The descriptor of the to-be-processed image is obtained by synthesizing the descriptor of the feature point of the to-be-processed image, the database creation image includes N (N is a positive integer) images and M (M is a positive integer) images, and a distance between the descriptor of the to-be-processed image and a descriptor of any one of the N images is less than or equal to a distance between the descriptor of the to-be-processed image and a descriptor of any one of the remaining M images in the database creation image.

When the visual feature database includes the descriptor of the database creation image, N images whose descriptors are relatively close are first coarsely selected from the visual feature database based on the descriptor of the to-be-processed image, and then the matching feature point of the feature point of the to-be-processed image is determined from feature points of the N images, so that a visual positioning process can be accelerated, and visual positioning efficiency can be improved.

With reference to the second aspect, in some implementations of the second aspect, that the feature point of the database creation image is feature points of scene images in a plurality of scenarios and the determining a matching feature point of the feature point of the to-be-processed image from a visual feature database based on the descriptor of the feature point of the to-be-processed image includes: determining a target scene image from the scene images in the plurality of scenarios; and determining the matching feature point of the feature point of the to-be-processed image from feature points of the target scene image based on the descriptor of the feature point of the to-be-processed image.

The target scene image is a scene image, in the scene images in the plurality of scenarios, whose corresponding scene is the closest to the scene when the to-be-processed image is photographed.

When the visual feature database includes the feature points of the plurality of types of scene images, the target scene image that is the closest to the scene when the to-be-processed image is photographed may be first determined from the plurality of types of scene images, and then the matching feature point of the feature point of the to-be-processed image is determined from the target scene image, so that a more accurate matching feature point can be determined for the feature point of the to-be-processed image, thereby improving the success rate of visual positioning.

With reference to the second aspect, in some implementations of the second aspect, that the visual feature database includes semantic information of the feature point of the database creation image and a confidence degree of the semantic information of the feature point of the database creation image and the determining, based on a 3D position of the matching feature point, posture information of a photographing unit when the photographing unit photographs the to-be-processed image includes: performing weighting processing on the 3D position of the matching feature point based on the confidence degree of the semantic information of the matching feature point; and determining, based on a weighting processing result, the posture information of the photographing unit when the photographing unit photographs the to-be-processed image.

When weighting processing is performed on the 3D position of the matching feature point, a matching feature point with a higher confidence degree corresponds to a larger weight.

In this application, when the visual feature database includes the semantic information of the feature point of the database creation image and the confidence degree of the semantic information of the feature point of the database creation image, semantic information and confidence degrees corresponding to different feature points can be considered during visual positioning, to determine importance degrees of the different feature points during visual positioning, so that more precise visual positioning can be performed, and accuracy of visual positioning can be improved.

With reference to the second aspect, in some implementations of the second aspect, the database creation image is a panoramic image.

Optionally, the visual feature database in the second aspect is constructed according to the visual feature database construction method in the first aspect.

When the quantity of database creation images is fixed, the visual feature database constructed according to the method in the first aspect includes information about a larger quantity of feature points of the database creation image. Therefore, when the quantity of database creation images is fixed, visual positioning is performed by using the visual feature database constructed according to the method in the first aspect, and the effectiveness of visual positioning can be improved.

According to a third aspect, a visual feature database construction apparatus is provided. The apparatus includes a module configured to perform the method according to the first aspect or any one of the implementations of the first aspect.

According to a fourth aspect, a visual positioning apparatus is provided. The apparatus includes a module configured to perform the method according to the second aspect and any one of the implementations of the second aspect.

According to a fifth aspect, a visual feature database construction apparatus is provided, including a memory and a processor, where the memory is configured to store a program, the processor is configured to execute the program, and when the program is executed, the processor is configured to perform the method according to the first aspect or any one of the implementations of the first aspect.

When the processor performs the method according to the first aspect or any one of the implementations of the first aspect, the processor may obtain a database creation image through (by invoking) a communications interface (the database creation image may be obtained from another apparatus through the communications interface), or obtain a database creation image from the memory (the database creation image is stored in the memory). Then, the processor performs a series of processing on the database creation image, to finally obtain the visual feature database.

According to a sixth aspect, a visual positioning apparatus is provided, including a memory and a processor, where the memory is configured to store a program, the processor is configured to execute the program, and when the program is executed, the processor is configured to perform the method according to the second aspect or any one of the implementations of the second aspect.

When the processor performs the method according to the second aspect or any one of the implementations of the second aspect, the processor may obtain a to-be-processed image through (invoking) a camera lens or obtain a to-be-processed image from the memory. Then, the processor performs a series of processing on the to-be-processed image, to finally implement visual positioning.

The visual feature database construction apparatus in the third aspect or the fifth aspect may be a server, a cloud device, or a computer device that has a specific computing capability.

The visual positioning apparatus in the fourth aspect or the sixth aspect may be specifically a mobile phone, a computer, a personal digital assistant, a wearable device, a vehicle-mounted device, an internet of things device, a virtual reality device, an augmented reality device, or the like.

According to a seventh aspect, a computer-readable storage medium is provided. The computer-readable storage medium is configured to store program code, and when the program code is executed by a computer, the computer is configured to perform the method according to the first aspect or any one of the implementations of the first aspect.

According to an eighth aspect, a computer-readable storage medium is provided. The computer-readable storage medium is configured to store program code. When the program code is executed by a computer, the computer is configured to perform the method according to the second aspect or any one of the implementations of the second aspect.

According to a ninth aspect, a chip is provided. The chip includes a processor, and the processor is configured to perform the method according to the first aspect or any one of the implementations of the first aspect.

The chip in the ninth aspect may be located in a server, or in a cloud device, or in a computer device that has a computing capability to construct a visual feature database.

According to a tenth aspect, a chip is provided. The chip includes a processor, and the processor is configured to perform the method according to the second aspect or any one of the implementations of the second aspect.

The chip in the tenth aspect may be located in a terminal device, and the terminal device may be a mobile phone, a computer, a personal digital assistant, a wearable device, a vehicle-mounted device, an internet of things device, a virtual reality device, an augmented reality device, or the like.

According to an eleventh aspect, a computer program (or referred to as a computer program product) used to enable a computer or a terminal device to perform the method according to the first aspect or any one of the implementations of the first aspect is provided.

According to a twelfth aspect, a computer program (or referred to as a computer program product) used to enable a computer or a terminal device to perform the method according to the second aspect or any one of the implementations of the second aspect is provided.

DESCRIPTION OF EMBODIMENTS

The following describes technical solutions of this application with reference to accompanying drawings.

Visual positioning is a process of using a series of algorithms such as feature extraction, feature matching, and perspective-n-point projection (PNP) by using an image or video photographed by a terminal device and a pre-established 3D map, to estimate a position and a posture of a photographing unit of the terminal device. Visual positioning can be applied to fields of augmented reality, unmanned driving, and intelligent mobile robot.

In the field of augmented reality, visual positioning may be specifically used for 3D navigation, 3D advertisement placement, virtual doll interaction, and the like. For example, a virtual 3D navigation icon or the like may be accurately placed at an appropriate position in a real scene, to implement precise positioning.

In the field of automatic driving, an accurate position of a vehicle may be obtained through visual positioning. In the field of intelligent mobile robot, a position and a posture of the intelligent mobile robot can be obtained in real time through visual positioning, to control a motion of the intelligent mobile robot.

A key of accurate visual positioning is to construct a visual feature database including enough accurate information. The following describes in detail the visual positioning method in the embodiments of this application with reference to the accompanying drawings.

Figure 1:
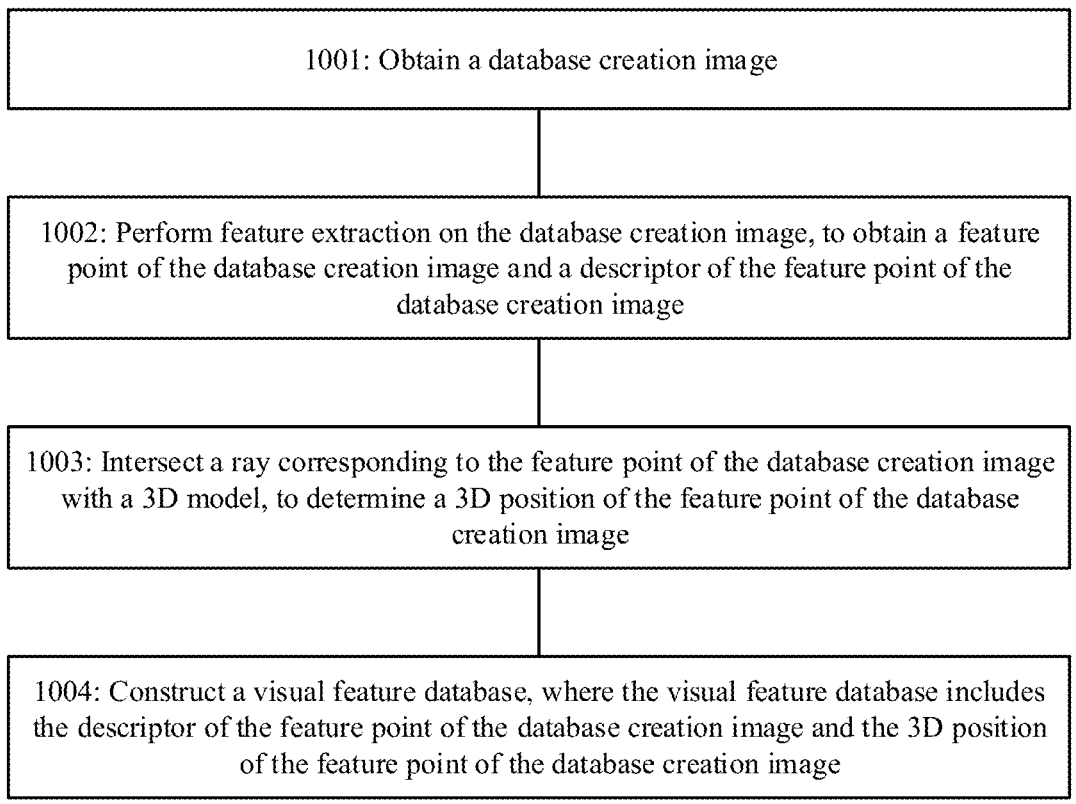
FIG. 1 is a schematic flowchart of a visual feature database construction method according to an embodiment of this application.

FIG. 1 is a schematic flowchart of a visual feature database construction method according to an embodiment of this application. The method shown in FIG. 1 may be executed by a visual feature database construction apparatus. The visual feature database construction apparatus may be a server, a cloud device, or a computer device that has a computing capability (the computing capability can construct a visual feature database).

The method shown in FIG. 1 includes steps 1001 to 1004, and the following separately describes the steps in detail.

1001: Obtain a database creation image.

The database creation image may be an image used to construct a visual feature database, and the database creation image may be one image, or may be a plurality of images. When the database creation image is a plurality of images, a processing process of the database creation image in this embodiment of this application may be considered as processing of any image in the database creation image.

The database creation image may be obtained by photographing using a camera, and the database creation image may be a panoramic image, or may be a non-panoramic image (for example, a wide-angle image). The database creation image may also be referred to as an image for database creation.

In the step 1001, when the database creation image is stored inside the camera, the visual feature database construction apparatus may obtain the database creation image from the camera in a manner of communicating with the camera. When the database creation image is stored in a memory in the visual feature database construction apparatus, the visual feature database construction apparatus may directly obtain the database creation image from the memory.

1002: Perform feature extraction on the database creation image, to obtain a feature point of the database creation image and a descriptor of the feature point of the database creation image.

It should be understood that, in this application, there may be a plurality of feature points of the database creation image, and the plurality of feature points of the database creation image are obtained by performing feature extraction on the database creation image. For ease of description, the name "the feature point of the database creation image" is uniformly used in this application.

In step 1002, feature extraction may be performed on the database creation image by using a feature extraction algorithm, to obtain the feature point of the database creation image and the descriptor of the feature point of the database creation image.

In the step 1002, feature extraction may be performed on the database creation image by using one or more types of feature extraction algorithms, to obtain the feature point of the database creation image and the descriptor of the feature point of the database creation image.

The feature extraction algorithm is an algorithm used to extract the feature point of the image and the descriptor of the feature point of the image. In this application, available feature extraction algorithms may include the following:

an ORB algorithm;

an SIFT algorithm;
a SuperPoint algorithm;
a D2-Net algorithm; and
a line feature algorithm.

The feature extraction algorithm may alternatively be referred to as a feature extraction operator.

In the step 1002, feature extraction may be performed on the database creation image by using one or more types of the ORB algorithm, the SIFT algorithm, the SuperPoint algorithm, the D2-net algorithm, and the line feature algorithm.

In this application, when feature extraction is performed on the database creation image by using the plurality of types of feature extraction algorithms, more types of feature points and descriptors of the feature points can be obtained from the database creation image, so that a finally constructed visual feature database can include more types of feature points, and the effectiveness of subsequently performing visual positioning based on the visual feature database can be improved.

Specifically, when the visual feature database includes a plurality of types of feature points and descriptors of the feature points, when visual positioning is performed on a to-be-processed image based on the visual feature database, a matching feature point that matches a feature point of the to-be-processed image can be more accurately determined from the plurality of types of feature points in the visual feature database, thereby improving the visual positioning effectiveness.

Figure 2:
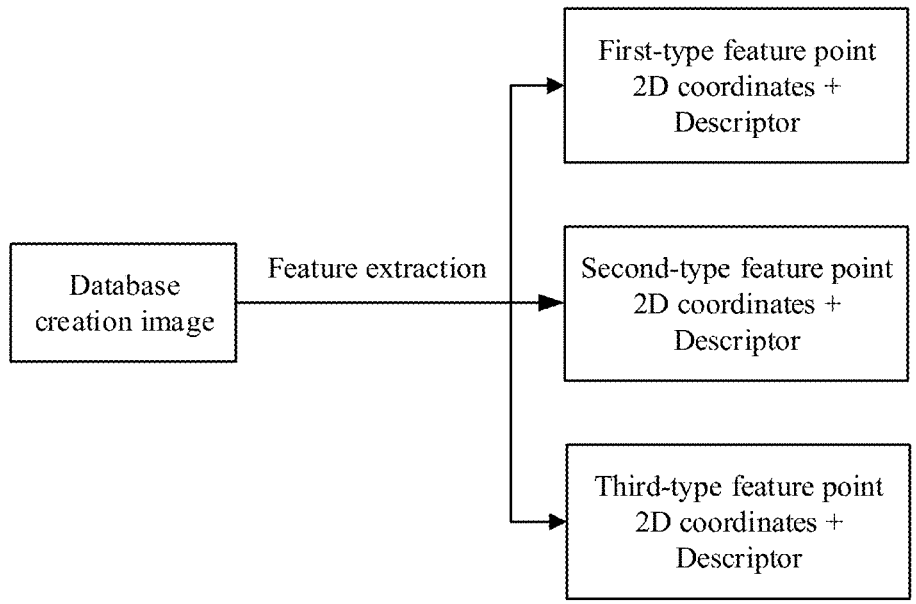
FIG. 2 is a schematic diagram of performing feature extraction on a database creation image.

The following describes a process of feature extraction on the database creation image with reference to FIG. 2.

As shown in FIG. 2, three types of feature extraction algorithms may be used to perform feature extraction on the database creation image, to obtain three types of feature points and descriptors of the three types of feature points.

The foregoing three types of feature extraction algorithms may include the following:

A first-type feature point, a second-type feature point, and a third-type feature point may be feature points obtained after feature extraction is performed on the database creation image according to the ORB algorithm, the SIFT algorithm, and the SuperPoint algorithm respectively. A descriptor of the first-type feature point, a descriptor of the second-type feature point, and a descriptor of the third-type feature point are also obtained according to a corresponding feature extraction algorithm, and 2D coordinates of each-type feature point may be directly obtained based on the database creation image.

1003: Intersect a ray corresponding to the feature point of the database creation image with a 3D model, to determine (obtain) a 3D position of the feature point of the database creation image.

In the step 1003, the 3D position of the feature point of the database creation image is the 3D position of the intersection point at which the ray corresponding to the feature point of the database creation image intersects with the 3D model, and the ray corresponding to the feature point of the database creation image is a ray that starts from a projection center of the database creation image and passes through the feature point of the database creation image.

The database creation image and the foregoing 3D model are located in the same coordinate system, and the projection center of the database creation image is a position (of a first photographing unit) when the first photographing unit photographs the database creation image. It should be understood that the first photographing unit herein is a photographing unit for photographing the database creation image.

Figure 3:
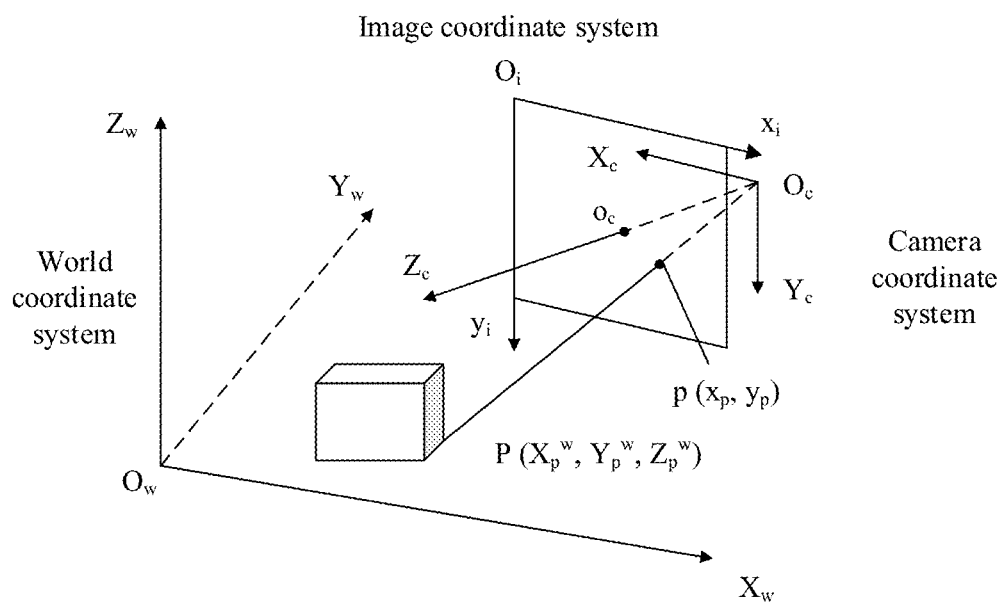
FIG. 3 is a schematic diagram of a process of determining a 3D position of a feature point of a database creation image.

With reference to FIG. 3, the following describes in detail a process of determining the 3D position of the feature point of the database creation image.

As shown in FIG. 3, coordinates of a feature point P of the database creation image in an image coordinate system of the database creation image are $[x_p \ y_p]^T$, and the feature point P is transformed to a camera coordinate system through coordinate transformation, to obtain coordinates of the feature point P in the camera coordinate system, as shown in formula (1).

$$\begin{bmatrix} X_p^c \\ Y_p^c \\ Z_p^c \end{bmatrix} = \begin{bmatrix} x_p - x_o \\ Y_p^c - y_o \\ f \end{bmatrix} \quad (1)$$

$[x_o \ y_o \ f]$ is a camera internal parameter, specifically, f is a camera focal length, and $(x_o, y_o)$ is a primary point position of the camera.

Next, the coordinates of the feature point P in the camera coordinate system are transformed to a world coordinate system, so that obtained coordinates of the feature point P in the world coordinate system are shown in formula (2).

$$\begin{bmatrix} X_p^w \\ Y_p^w \\ Z_p^w \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} X_p^c \\ Y_p^c \\ Z_p^c \end{bmatrix} + \begin{bmatrix} X_c^w \\ Y_c^w \\ Z_c^w \end{bmatrix} \quad (2)$$

$$\begin{bmatrix} a_{11} & a_{12} & a_{13} \\ a_{21} & a_{22} & a_{23} \\ a_{31} & a_{32} & a_{33} \end{bmatrix}$$

is a rotation matrix for transforming the feature point P from the camera coordinate system to the world coordinate system, a parameter of the rotation matrix may be determined based on a positional relationship between the camera coordinate system and the world coordinate system, and $$\begin{bmatrix} X_c^w \\ Y_c^w \\ Z_c^w \end{bmatrix}$$

is coordinates of a camera projection center in the world coordinate system.

After the foregoing coordinate transformation process, the feature point P is transformed to the world coordinate system. In this case, the database creation image is transformed to the world coordinate system. Because the 3D model itself shown in FIG. 3 (a hexahedron in the world coordinate system in FIG. 3 represents the 3D model) is in the world coordinate system, both the database creation image and the 3D model are in the world coordinate system. Next, a ray passing through the feature point P is constructed by using the origin of the camera coordinate system as a start point, and the 3D position of the intersection point at which the ray intersects with the 3D model is the 3D position of the feature point P. As shown in FIG. 3, position coordinates of the intersection point are $(X_p^w\ Y_p^w\ Z_p^w)$. Therefore, the 3D position of the feature point P obtained through ray intersection is $(X_p^w\ Y_p^w\ Z_p^w)$.

1004: Construct the visual feature database, where the visual feature database includes the descriptor of the feature point of the database creation image and the 3D position of the feature point of the database creation image.

In this application, the 3D position of the feature point of the database creation image is obtained by intersecting the ray with the 3D model. Compared with a conventional solution in which only a 3D position of a matched feature point between images can be obtained, when the quantity of database creation images is fixed, information about a larger quantity of feature points is obtained from the database creation images, so that a constructed visual feature database includes the information about the larger quantity of feature points.

When the quantity of database creation images is fixed, the visual feature database constructed according to this application includes the information about the larger quantity of feature points, so that a better visual positioning effect is obtained when the visual feature database is subsequently used to perform visual positioning.

In addition, when the quantity of database creation images is fixed, the visual feature database constructed according to the visual feature database construction method in this application includes the information about the larger quantity of feature points. Therefore, the visual feature database construction method in this application can be applied to scenarios, such as a relatively large radiation difference and a weak texture, in which accurate visual positioning is difficult to be performed. In these scenarios, visual positioning can be performed by using the visual feature database obtained in the visual feature database construction method in this embodiment of this application to obtain a better visual positioning effect.

In this application, in addition to including the descriptor of the feature point of the database creation image and the 3D position of the feature point of the database creation image, the visual feature database may further include the following two types of information:

(1) Semantic information of the feature point of the database creation image and a confidence degree of the semantic information of the feature point of the database creation image.

(2) A descriptor of the database creation image.

Specifically, in the visual feature database construction method in this application, after one or more of the foregoing three types of information are generated, one or more of the three types of information may be written (saved) into the visual feature database.

The following describes in detail a generation process of the foregoing two types of information with reference to the accompanying drawings.

(1) The semantic information of the feature point of the database creation image and the confidence degree In this application, the semantic information of the feature point of the database creation image and the confidence degree may be determined by using step A and step B.

Step A: Perform semantic segmentation on the database creation image to obtain a semantic segmentation result of the database creation image.

Step B: Generate the semantic information of the feature point of the database creation image and the confidence degree of the semantic information of the feature point of the database creation image based on the semantic segmentation result of the database creation image.

The semantic segmentation result of the database creation image obtained in step A includes semantic information of each region of the database creation image and a confidence degree of the semantic information of each region. Next, in step B, semantic information of a region in which the feature point of the database creation image is located may be determined as the semantic information of the feature point of the database creation image. A confidence degree of the semantic information of the region in which the feature point of the database creation image is located is determined as the confidence degree of the semantic information of the feature point of the database image.

Figure 4:
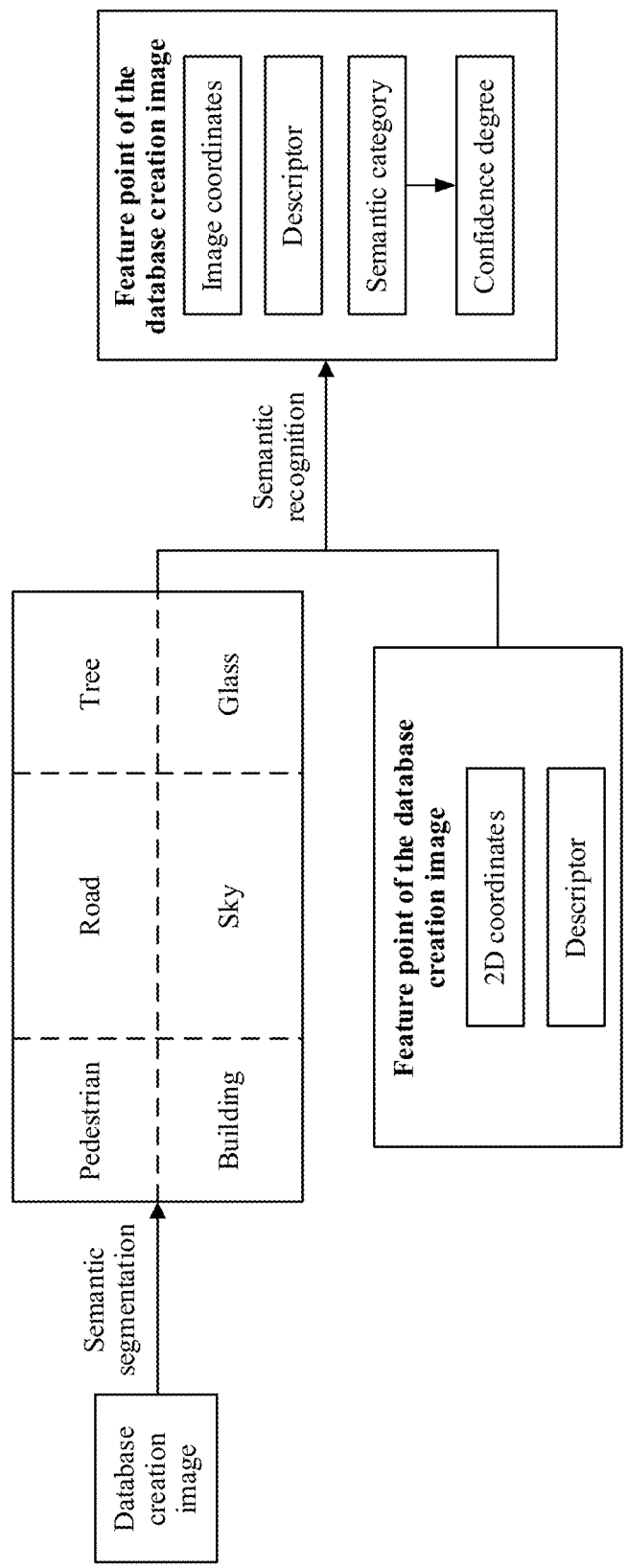
FIG. 4 is a schematic diagram of performing semantic segmentation on a database creation image to obtain semantic information of the database creation image and a confidence degree.

As shown in FIG. 4, semantic segmentation is performed on the database creation image, to divide the database creation image into six corresponding regions, and semantics of images in the six regions are a pedestrian, a road, a tree, a building, sky, and glass.

Next, semantic recognition may be performed on the feature point of the database creation image. During semantic recognition, an image region in which the feature point of the database creation image is located may be specifically determined based on 2D coordinates of the feature point of the database creation image. Semantic information of the image region in which the feature point is located is semantic information of the feature point. Therefore, the obtained information of the feature point of the database creation image not only includes the 2D coordinates of the feature point and the descriptor of the feature point, but also includes the semantic information of the feature point and the confidence degree of the semantic information of the feature point.

For example, for a feature point of the database creation image, if it is determined, by using 2D coordinates of the feature point, that a semantic of an image region in which the feature point is located is a road, it may be determined that a semantic of the feature point is also a road.

It should be understood that, in the process shown in FIG. 4, semantic segmentation is directly performed on the database creation image, to finally obtain a semantic category (a specific representation form of the semantic information) of the feature point of the database creation image and a confidence degree of the semantic category of the feature point of the database creation image. Actually, in this application, the database creation image may be first segmented (a segmentation process may be shown in FIG. 1), and then semantic segmentation is performed on an obtained slice image, to finally obtain the semantic information of the feature point of the database creation image and the confidence degree of the semantic information of the feature point of the database creation image.

In addition, in this application, scene simulation may be first performed on the database creation image, and after a plurality of types of scene images are obtained, semantic segmentation is performed on a plurality of scenarios, to finally obtain the semantic information of the feature point of the database creation image and the confidence degree of the semantic information of the feature point of the database creation image.

(2) The descriptor of the database creation image

In this application, the descriptor of the feature point of the database creation image may be synthesized to obtain the descriptor of the database creation image.

The descriptor of the feature point of the database creation image is synthesized to obtain the descriptor of the database creation image, and the descriptor of the database creation image may be written into the visual feature database, so that information included in the visual feature database is richer.

Figure 5:
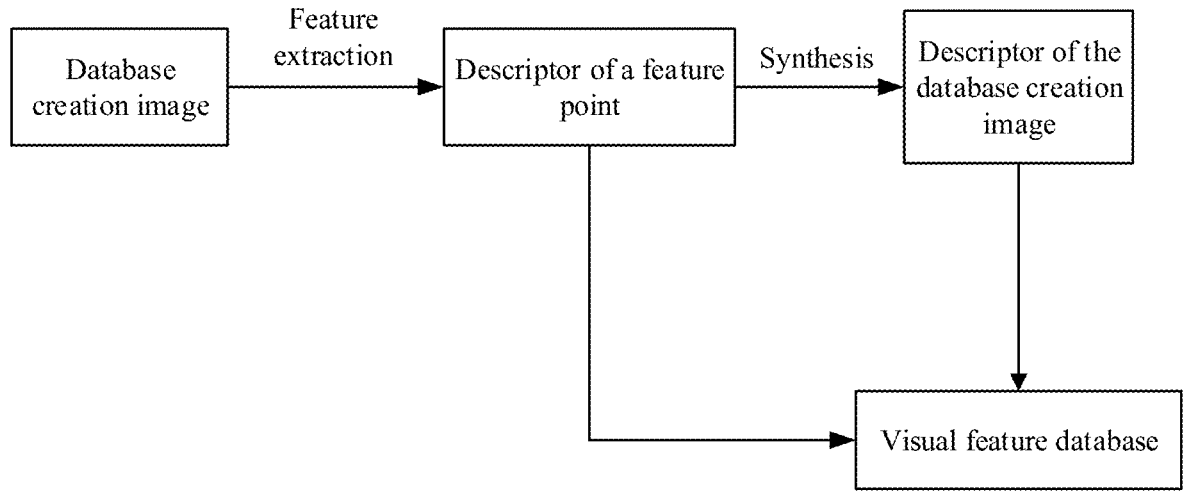
FIG. 5 is a schematic diagram of a process of obtaining a descriptor of a database creation image.

As shown in FIG. 5, feature extraction is performed on the database creation image by using a feature extraction algorithm (may be one of the ORB algorithm, the SIFT algorithm, the SuperPoint algorithm, the D2-net algorithm, and the line feature algorithm) to obtain the descriptor of the feature point. Next, the descriptor of the feature point is synthesized to obtain the descriptor of the database creation image. Then, the descriptor of the feature point and the descriptor of the database creation image are written into the visual feature database.

When the feature point of the database creation image is extracted, feature extraction may be further performed on the database creation image by using a plurality of types of feature extraction algorithms, to obtain a plurality of types of feature points and descriptors of the feature points. Then, a descriptor of each-type feature point may be synthesized to obtain the descriptor of the database creation image.

Figure 6:
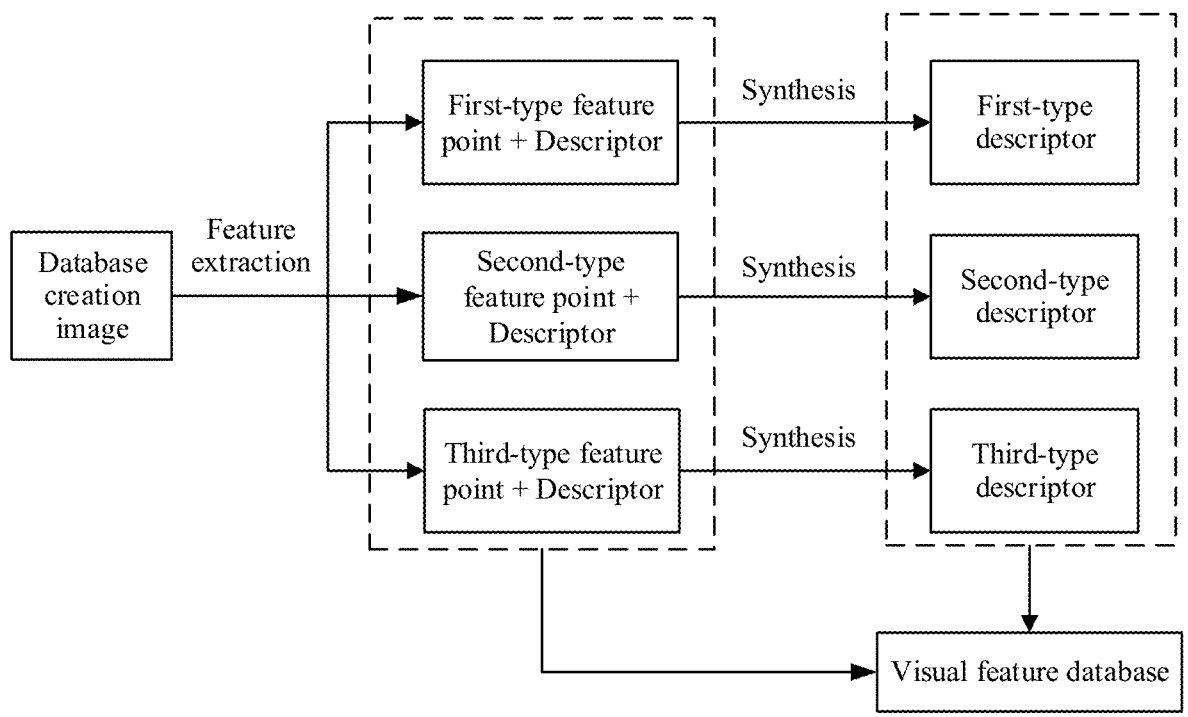
FIG. 6 is a schematic diagram of a process of obtaining a descriptor of a database creation image.

As shown in FIG. 6, feature extraction is performed on the database creation image by using three types of different feature extraction algorithms (may be any three of the ORB algorithm, the SIFT algorithm, the SuperPoint algorithm, the D2-net algorithm, and the line feature algorithm), to obtain a first-type feature point and a descriptor thereof, a second-type feature point and a descriptor thereof, and a third-type feature point and a descriptor thereof. Next, the descriptor of the first-type feature point may be synthesized to obtain a first-type descriptor of the database creation image, and the descriptor of the second-type feature point may be synthesized to obtain a second-type descriptor of the database creation image, and the descriptor of the third-type feature point are synthesized to obtain a third-type descriptor of the database creation image. Next, different types of descriptors of the feature points and different types of descriptors of the database creation image may be written into the visual feature database.

In addition, when the descriptor of the database creation image is saved, the descriptor of the database creation image may be saved in an image retrieval database in the visual feature database, to facilitate subsequent search during visual positioning.

To simulate images in different scenarios, in this application, when feature extraction is performed based on the database creation image, scene simulation may be first performed on the database creation image to obtain scene images in the different scenarios, and then feature extraction is performed on the scene images in the different scenarios. Therefore, more feature points of the image in the scenario and descriptors are obtained.

Optionally, the step 1002 specifically includes:

1002a: Perform scene simulation on the database creation image, to generate database creation images in a plurality of scenarios.

1002b: Perform feature extraction on the database creation images in the plurality of scenarios, to obtain the feature point of the database creation image and the descriptor of the feature point of the database creation image.

The plurality of scenarios in the step 1002a may include at least two of daytime, night, rainy day, snowy day, and cloudy day.

By performing scene simulation on the database creation image, the scene images in the different scenarios can be obtained, and information extracted from the different scene images can be obtained, so that information included in the finally generated visual feature database is richer.

Figure 7:
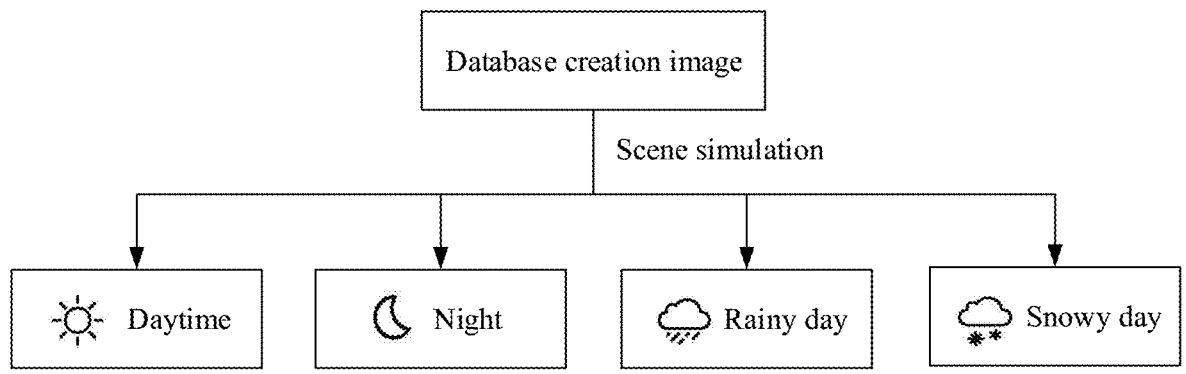
FIG. 7 is a schematic diagram of performing scene simulation on a database creation image to obtain a plurality of types of scene images.

For example, as shown in FIG. 7, scene simulation is performed on the database creation image, to obtain scene images in scenarios such as daytime, night, rainy day, and snowy day. It should be understood that FIG. 7 shows scene images in only some scenarios. In this application, scene simulation may be performed on the database creation image to obtain a scene image in another scenario, for example, a scene image in a scenario, for example, cloudy day.

It should be understood that, in the process shown in FIG. 7, scene simulation is directly performed on the database creation image, to obtain the plurality of types of scene images. Actually, in this application, the database creation image may be first segmented (a segmentation process may be shown in FIG. 8), and then scene simulation is performed on an obtained slice image, to obtain a plurality of types of scene images.

Because an imaging manner of panoramic projection is different from an imaging manner of an image photographed by a user, when the database creation image is a panoramic image, slice images with different angles of view can be obtained by performing segmentation processing on the database creation image. Therefore, the difference between the imaging manner of the database creation image and the imaging manner of the image photographed by the user is eliminated, so that when visual positioning is performed on the image photographed by the user based on the visual feature database, a matching feature point of a feature point of the image photographed by the user can be more accurately determined.

Optionally, the step 1002 specifically includes the following steps.

1002c: Perform segmentation processing on the database creation image to obtain a plurality of slice images.

1002d: Perform feature extraction on the plurality of slice images, to obtain the feature point of the database creation image and the descriptor of the feature point of the database creation image.

In the plurality of slice images obtained in step 1002c, partial image content of adjacent slice images is the same. The database creation image in the step 1002c may be specifically a panoramic image or a wide-angle image.

Figure 8:
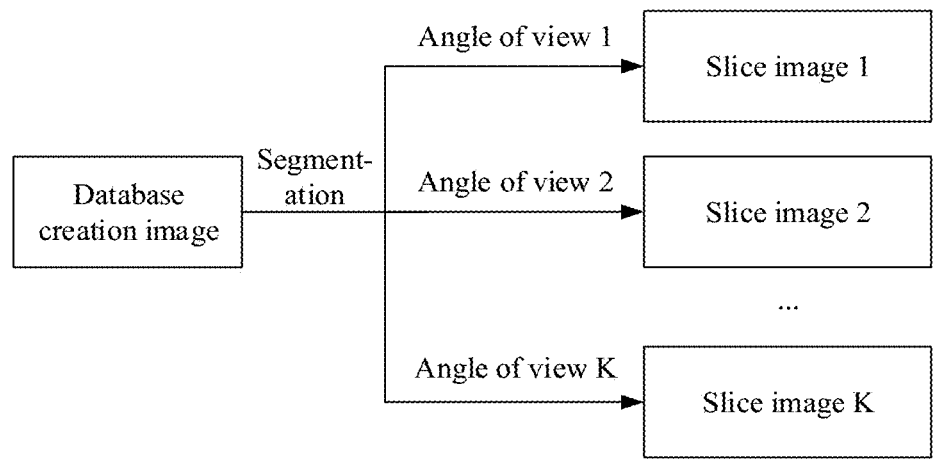
FIG. 8 is a schematic diagram of segmenting a database creation image to obtain a slice image.

The following describes an image segmentation process with reference to FIG. 8.

As shown in FIG. 8, segmentation processing (which may also be referred to as projection processing) may be performed on the database creation image, to obtain a slice image 1 to a slice image K, and different slice images correspond to different angles of view (angles of view corresponding to the slice image 1 to the slice image K are an angle of view 1 to an angle of view K respectively). In the slice image 1 to the slice image K, a slice image i and a slice image i+1 are adjacent slice images, where $1 \leq i < K$, and K is a positive integer.

A value of K may be set based on a requirement of constructing the visual feature database.

When the value of K is set, an angle of view of the image photographed by the user may be relatively close to that of the slice image obtained through segmentation. The value of K may be specifically a value, for example, 8, 12, or 16.

Parts of the image content of the adjacent slice images obtained through segmentation in the segmentation process shown in FIG. 8 are the same. For example, the slice image 1 and a slice image 2 are adjacent, and parts of the image content of the slice image 1 and the slice image 2 are the same.

It should be understood that, in the segmentation process shown in FIG. 8, the database creation image is directly segmented, to obtain the plurality of slice images. Actually, in this application, scene simulation may be first performed on the database creation image (a scene simulation process may be shown in FIG. 7), and then each scene image is segmented, to obtain the plurality of slice images.

In this application, a series of processing is performed on the database creation image to obtain the visual feature database. To make the information included in the visual feature database more real-time, crowdsourcing update may be further performed. Crowdsourcing update herein means that a to-be-processed image from user equipment may be received, a series of processing is performed on the to-be-processed image, and a descriptor of a feature point of the to-be-processed image and the descriptor of the to-be-processed image are also written into the visual feature database, to update the visual feature database, so that the visual feature database includes more information.

When feature extraction is performed on the database creation image, scene simulation may be first performed on the database creation image, to obtain the scene images in the plurality of scenarios, and then segmentation processing is performed on a scene image in each scenario (certainly, segmentation processing may also be performed only on some of the scene images) to obtain the plurality of slice images.

Specifically, in the step 1002, the performing feature extraction on the database creation image, to obtain the feature point of the database creation image and the descriptor of the feature point of the database creation image includes the following steps.

1002e: Perform scene simulation on the database creation image, to obtain scene images in a plurality of scenarios, and separately perform segmentation processing on the scene images in the plurality of scenarios, to obtain a plurality of slice images.

1002f: Perform feature extraction on the plurality of slice images, to obtain the feature point of the database creation image and the descriptor of the feature point of the database creation image.

The plurality of scenarios includes at least two of daytime, night, rainy day, snowy day, and cloudy day. Parts of the image content of adjacent slice images are the same in the plurality of slice images.

It is assumed that scene simulation is performed on the database creation image, to obtain scene images in three scenarios: a first scene image, a second scene image, and a third scene image. Next, segmentation processing is separately performed on the first scene image, the second scene image, and the third scene image, to obtain the plurality of slice images. Assuming that each scene image is segmented to obtain eight slice images, segmentation processing is separately performed on the first scene image, the second scene image, and the third scene image to obtain 24 slice images, and then feature extraction is performed on the 24 slice images. Therefore, the feature point of the database creation image and the descriptor are obtained.

Figure 9:
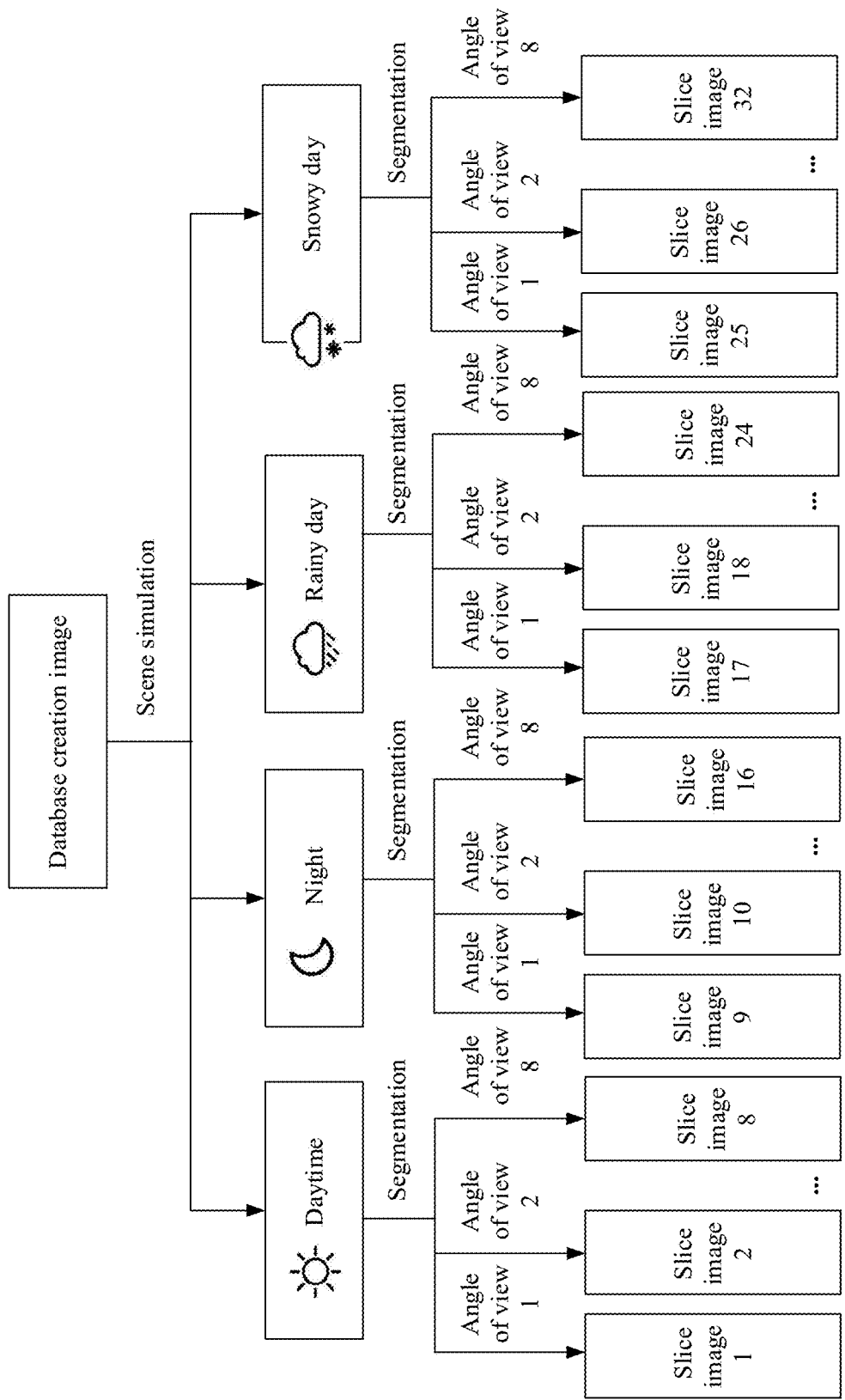
FIG. 9 is a schematic diagram of performing scene simulation and segmentation processing on a database creation image.

For example, as shown in FIG. 9, scene simulation may be first performed on the database creation image, to obtain scene images in four scenarios: daytime, night, rainy day, and snowy day, and then each scene image is segmented into eight slice images. For example, an image in the daytime scenario is segmented, to obtain eight slice images whose angles field of view are respectively an angle of view 1 to an angle of view 8. Segmentation processing is performed on images in the four scenarios, to finally obtain a slice image 1 to a slice image 32. Next, feature extraction may be performed on the 32 slice images, to obtain the feature point of the database creation image and the descriptor of the feature point of the database creation image.

It should be understood that, in the process shown in FIG. 9, when an image in each scenario is segmented, a quantity of slice images obtained through segmentation may be different. For example, a quantity of slice images obtained by segmenting the scene images in the four scenarios: daytime, night, rainy day, and snowy day are 8, 8, 12, and 12 respectively (the quantity herein is only an example, and may be another quantity).

In the step 1002, segmentation processing may also be first performed on the database creation image to obtain slice images, and then scene simulation is performed on each slice image (certainly, scene simulation may also be performed on some of the slice images).

Specifically, in the step 1002, the performing feature extraction on the database creation image, to obtain the feature point of the database creation image and the descriptor of the feature point of the database creation image includes the following steps.

1002r: Perform segmentation processing on the database creation image to obtain a plurality of slice images.

1002s: Perform scene simulation on each of the plurality of slice images, to obtain scene images in a plurality of scenarios.

1002t: Perform feature extraction on the scene images in the plurality of scenarios, to obtain the feature point of the database creation image and the descriptor of the feature point of the database creation image.

Parts of the image content of adjacent slice images are the same in the plurality of slice images, and the plurality of scenarios includes at least two of daytime, night, rainy day, snow day, and cloudy day.

It is assumed that segmentation processing is performed on the database creation image to obtain eight slice images, and then scene simulation is performed on the eight slice images. Assuming that scene simulation is performed on each slice image to obtain scene images in four scenarios, scene simulation is separately performed on the eight slice images to obtain 32 scene images, and then feature extraction is performed on the 32 scene images. Therefore, the feature point of the database creation image and the descriptor are obtained.

The performing feature extraction on the database creation image by using the plurality of types of feature extraction algorithms may be: first performing segmentation processing and/or scene simulation on the database creation image, and then performing feature extraction on the obtained image, to obtain the feature point of the database creation image and the descriptor of the feature point of the database creation image.

Figure 10:
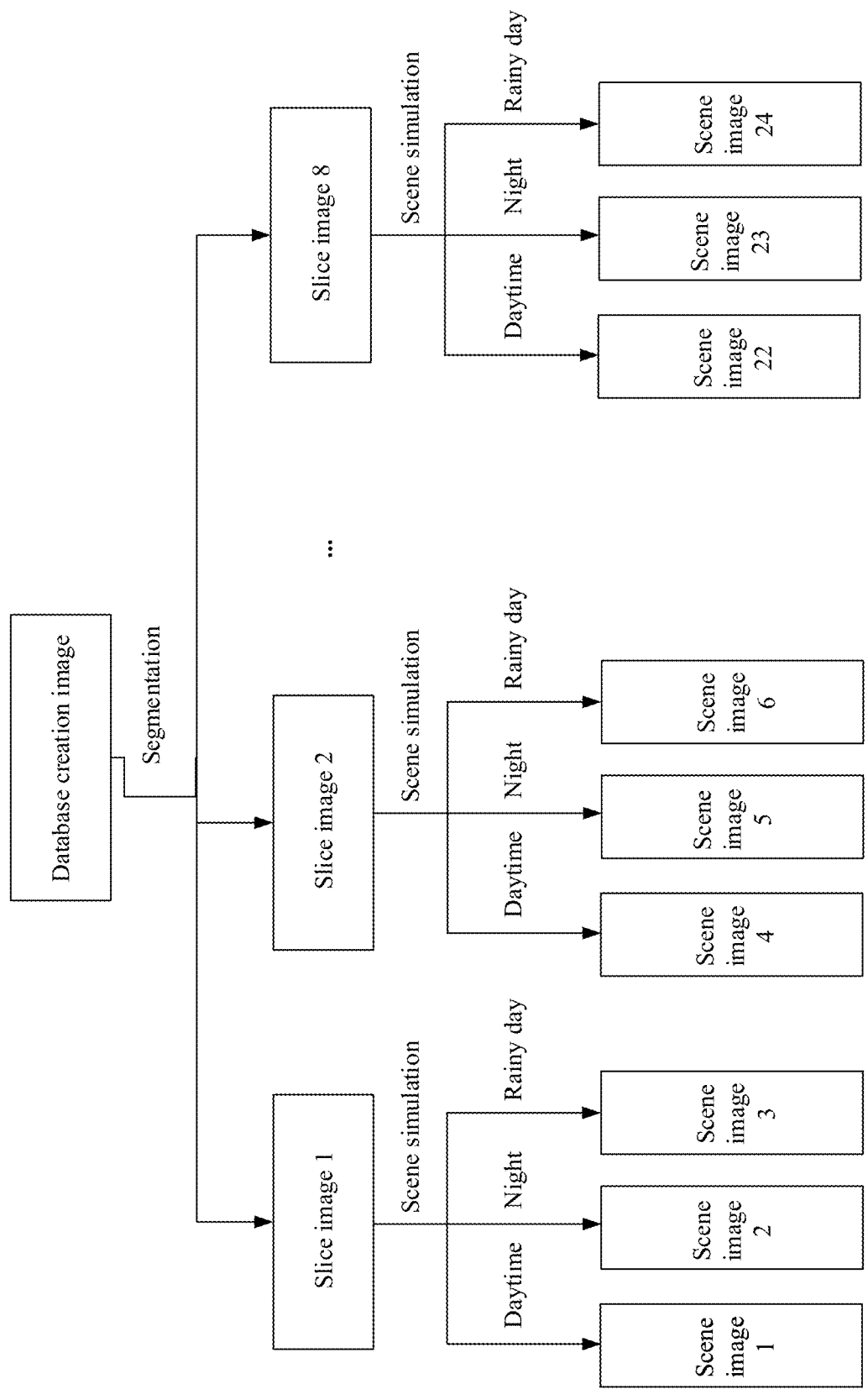
FIG. 10 is a schematic diagram of performing segmentation processing and scene simulation on a database creation image.

For example, as shown in FIG. 10, segmentation processing may be first performed on the database creation image to obtain a slice image 1 to a slice image 8, and then scene simulation is separately performed on the eight slice images, to obtain scene images in scenarios such as daytime, night, and rainy day. Specifically, as shown in FIG. 10, scene simulation is performed on the slice image 1 to the slice image 8, to obtain a scene image 1 to a scene image 24. Next, feature extraction may be performed on the scene image 1 to the scene image 24, to obtain the feature point of the database image and the descriptor of the feature point of the database image.

It should be understood that the quantity of slice images and the scenario shown in FIG. 10 are both examples for description. Actually, another quantity of slice images may be alternatively obtained when segmentation processing is performed on the database creation image, and when scene simulation is performed on the slice images, an image in another scenario may also be obtained.

In the step 1002, segmentation processing or scene simulation may be alternatively first performed on the database creation image, and then feature extraction is performed by using the plurality of types of feature extraction algorithms.

Specifically, in the step 1002, the performing feature extraction on the database creation image, to obtain the feature point of the database creation image and the descriptor of the feature point of the database creation image includes the following steps.

1002*j*: Perform segmentation processing on the database creation image to obtain a plurality of slice images.

1002*k*: Perform feature extraction on each of the plurality of slice images by using a plurality of types of feature extraction algorithms, to obtain the feature point of the database creation image and the descriptor of the feature point of the database creation image.

Parts of the image content of adjacent slice images are the same in the plurality of slice images.

For example, segmentation processing is performed on the database creation image to obtain 12 slice images, and then feature extraction is performed on each of the 12 slice images by using three types of feature extraction algorithms. Therefore, the feature point of the database creation image and the descriptor of the feature point of the database creation image are obtained.

Specifically, in the step 1002, the performing feature extraction on the database creation image, to obtain the feature point of the database creation image and the descriptor of the feature point of the database creation image includes the following steps.

1002*g*: Perform scene simulation on the database creation image, to generate scene images in a plurality of scenarios.

1002*h*: Separately perform feature extraction on the scene images in the plurality of scenarios by using a plurality of types of feature extraction algorithms, to obtain the feature point of the database creation image and the descriptor of the feature point of the database creation image.

The plurality of scenarios includes at least two of daytime, night, rainy day, snowy day, and cloudy day.

For example, scene simulation is performed on the database creation image to obtain scene images in four scenarios. Next, feature extraction is separately performed on scene images in the four scenarios by using three types of feature extraction algorithms. Therefore, the feature point of the database creation image and the descriptor of the feature point of the database creation image are obtained.

In the step 1002, segmentation processing and scene simulation may be alternatively first separately performed on the database creation image (segmentation processing is performed before scene simulation, or scene simulation is performed before scenario segmentation), and then feature extraction is performed by using the plurality of types of feature extraction algorithms.

Specifically, in the step 1002, the performing feature extraction on the database creation image, to obtain the feature point of the database creation image and the descriptor of the feature point of the database creation image includes the following steps.

1002*u*: Perform scene simulation on the database creation image, to obtain scene images in a plurality of scenarios.

1002*v*: Separately perform segmentation processing on the scene images in the plurality of scenarios, to obtain a plurality of slice images.

1002*w*: Separately perform feature extraction on the plurality of slice images by using a plurality of types of feature extraction algorithms, to obtain the feature point of the database creation image and the descriptor of the feature point of the database creation image.

The plurality of scenarios includes at least two of daytime, night, rainy day, snowy day, and cloudy day. Partial image content of adjacent slice images is the same in the plurality of slice images.

For example, scene simulation is performed on the database creation image, to obtain scene images in three scenarios: a first scene image, a second scene image, and a third scene image. Next, segmentation processing is separately performed on the first scene image, the second scene image, and the third scene image. Each scene image is segmented to obtain eight slice images. In this case, segmentation processing is separately performed on the first scene image, the second scene image, and the third scene image, to obtain 24 slice images. Then, feature extraction is separately performed on the 24 slice images by using three types of feature extraction algorithms. Therefore, the feature point of the database creation image and the descriptor are obtained.

Specifically, in the step 1002, the performing feature extraction on the database creation image, to obtain the feature point of the database creation image and the descriptor of the feature point of the database creation image includes the following steps.

1002*x*: Perform segmentation processing on the database creation image to obtain a plurality of slice images.

1002*y*: Perform scene simulation on each of the plurality of slice images, to obtain scene images in a plurality of scenarios.

1002*z*: Separately perform feature extraction on the scene images in the plurality of scenarios by using a plurality of types of feature extraction algorithms, to obtain the feature point of the database creation image and the descriptor of the feature point of the database creation image.

Partial image content of adjacent slice images is the same in the plurality of slice images, and the plurality of scenarios includes at least two of daytime, night, rainy day, snow day, and cloudy day.

For example, segmentation processing is performed on the database creation image to obtain eight slice images, scene simulation is performed on each of the eight slice images to obtain scene images in four scenarios, to obtain 32 images in total, and then feature extraction is separately performed on the 32 images by using three types of feature extraction algorithms. Therefore, the feature point of the database creation image and the descriptor are obtained.

Optionally, the method shown in FIG. 1 may further include the following steps.

2001: Receive a to-be-processed image from user equipment.

2002: Perform feature extraction on the to-be-processed image, to obtain a feature point of the to-be-processed image and a descriptor of the feature point of the to-be-processed image.

2003: Intersect a ray corresponding to the feature point of the to-be-processed image with the 3D model, to determine a 3D position of the feature point of the to-be-processed image.

2004: Update the visual feature database, where the updated visual feature database includes the feature point of the to-be-processed image and the 3D position of the feature point of the to-be-processed image.

The 3D position of the feature point of the to-be-processed image is the 3D position of the intersection point at which the ray corresponding to the feature point of the to-be-processed image intersects with the 3D model, the ray corresponding to the feature point of the to-be-processed image is a ray that starts from a projection center of the to-be-processed image and passes through the feature point of the to-be-processed image, the to-be-processed image and the 3D model are located in the same coordinate system, and the projection center of the to-be-processed image is a position of a second photographing unit when the second photographing unit photographs the to-be-processed image.

In this application, the to-be-processed image from the user equipment is obtained, and the visual feature database is updated after the 3D position of the feature point of the to-be-processed image is determined, so that information included in the updated visual feature database is more real-time.

The processing process of step 2001 to step 2003 is the same as the process described in step 1001 to step 1003, and details are not described herein again.

Optionally, before 2005 is performed, 2006 and 2007 may be first performed.

2007: Determine a reference image from the visual feature database.

2008: Determine that semantic information of the to-be-processed image is different from semantic information of the reference image.

The reference image is an image, in the visual feature database, that is closest to a position of the to-be-processed image.

A position of the reference image and the position of the to-be-processed image may be respectively determined based on a 3D position of a feature point of the reference image and the 3D position of the feature point of the to-be-processed image. That the reference image is determined from the visual feature database is specifically that a 3D position of a feature point of each image in the database creation image may be compared with the 3D position of the feature point of the to-be-processed image, and an image whose 3D position of a feature point is the closest (the 3D position of the feature point coincides with the 3D position of the to-be-processed image most) to the 3D position of the to-be-processed image is selected as the reference image.

In this application, when the semantic information of the reference image in the visual feature database is different from the semantic information of the to-be-processed image in the visual feature database, it indicates that image content of an object corresponding to the to-be-processed image may have changed. In this case, the visual feature database is updated, the visual feature database can be updated in time when semantic information reflected by image information is not accurate enough, and the visual feature database is more real time.

The visual feature database construction method in this embodiment of this application is described in detail above with reference to the accompanying drawings. It should be understood that the visual feature database constructed according to the visual feature database construction method in this embodiment of this application may be used to perform visual positioning. The following describes in detail the visual positioning method in the embodiments of this application with reference to the accompanying drawings.

Figure 11:
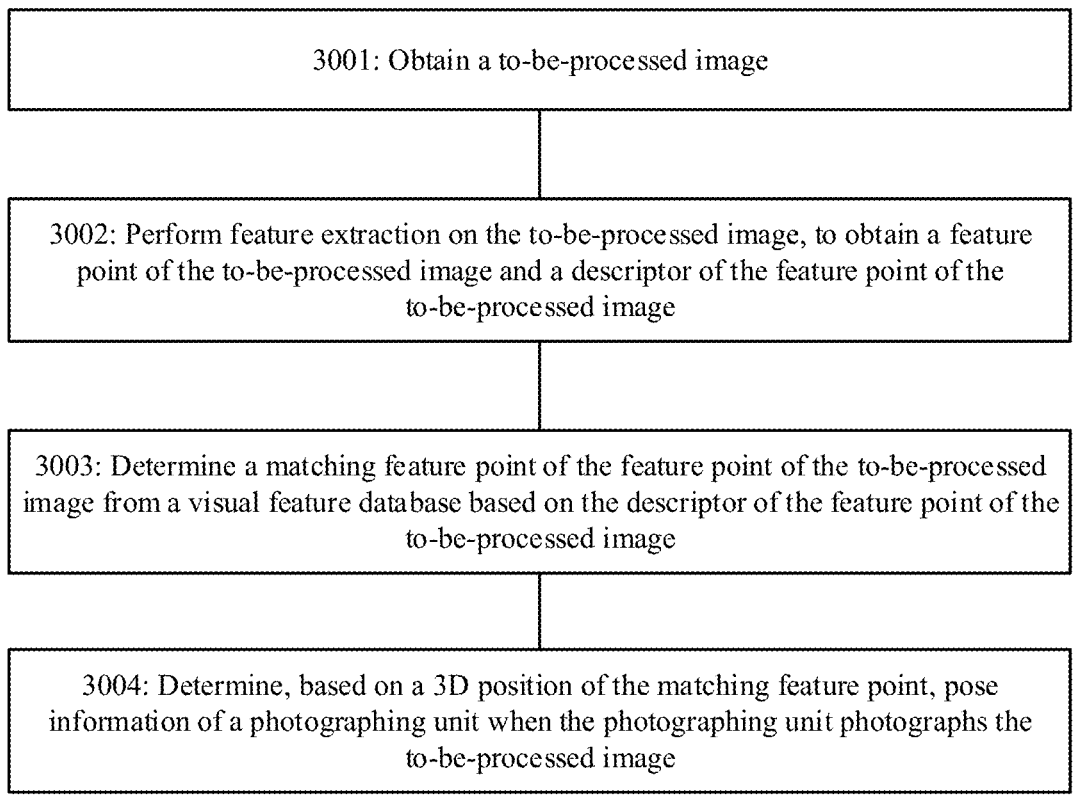
FIG. 11 is a schematic flowchart of a visual positioning method according to an embodiment of this application.

FIG. 11 is a schematic flowchart of a visual positioning method according to an embodiment of this application. In the method shown in FIG. 11, visual positioning may be performed by using the visual feature database constructed according to the method shown in FIG. 1. The method shown in FIG. 11 may be executed by a visual positioning device, and the visual positioning device may be specifically a mobile phone, a computer, a personal digital assistant, a wearable device, a vehicle-mounted device, an internet of things device, a virtual reality device, an augmented reality device, or the like.

The method shown in FIG. 11 includes step 3001 to step 3004, and the following describes step 3001 to step 3004 in detail.

3001: Obtain a to-be-processed image.

The to-be-processed image may be an image photographed by the visual positioning device. For example, the to-be-processed image may be an image photographed by the mobile phone.

3002: Perform feature extraction on the to-be-processed image, to obtain a feature point of the to-be-processed image and a descriptor of the feature point of the to-be-processed image.

For a specific implementation process of step 3002, refer to the foregoing description of step 1002. To avoid unnecessary repetition and redundancy, details are not described herein again.

3003: Determine a matching feature point of the feature point of the to-be-processed image from a visual feature database based on the descriptor of the feature point of the to-be-processed image.

Specifically, in step 3003, the matching feature point of the feature point of the to-be-processed image may be determined from the visual feature database based on the descriptor of the feature point of the to-be-processed image. The descriptor of the matching feature point, in the visual feature database, is closest to the descriptor of the feature point of the to-be-processed image.

3004: Determine, based on a 3D position of the matching feature point, posture information of a photographing unit when the photographing unit photographs the to-be-processed image.

The visual feature database includes a descriptor of a feature point of a database creation image and a 3D position of the feature point of the database creation image, and the visual feature database meets at least one of the following conditions:

the feature point of the database creation image includes a plurality of groups of feature points, and descriptors of any two of the plurality of groups of feature points have different description manners;

the visual feature database includes a descriptor of the database creation image, and the descriptor of the database creation image is obtained by synthesizing the descriptor of the feature point of the database creation image;

the feature point of the database creation image is feature points of a plurality of types of scene images, the plurality of types of scene images are obtained by performing scene simulation on the database creation image, and the plurality of scenarios includes at least two of daytime, night, rainy day, snowy day, and cloudy day;

the feature point of the database creation image and the descriptor of the feature point of the database creation image are obtained by performing feature extraction on a plurality of slice images, the plurality of slice images are obtained by performing segmentation processing on the database creation image, and partial image content of adjacent slice images is the same in the plurality of slice images; and the visual feature database includes semantic information of the feature point of the database creation image and a confidence degree of the semantic information of the feature point of the database creation image.

Compared with a visual feature database in the conventional solution, the visual feature database in this embodiment of this application includes richer information. Therefore, when visual positioning is performed based on the visual feature database in this embodiment of this application, a better visual positioning effectiveness can be obtained, and a visual positioning effect can be more accurate.

The determining, based on a 3D position of the matching feature point, posture information of a photographing unit when the photographing unit photographs the to-be-processed image in step 3004 is that the 3D position of the matching feature point may be first determined as a position of the feature point of the to-be-processed image, and then, the posture information of the photographing unit when the photographing unit photographs the to-be-processed image is determined based on the position of the feature point of the to-be-processed image.

It should be understood that, in this application, there may be a plurality of feature points of the to-be-processed image, and the posture information of the photographing unit when the photographing unit photographs the to-be-processed image can be derived based on 3D positions of the plurality of feature points of the to-be-processed image. For ease of description, the name "the feature point of the to-be-processed image" is uniformly used in this application.

When the visual feature database includes different information, a visual positioning process in this embodiment of this application may be different. The following describes in detail a visual positioning process when the visual feature database includes different information.

Case 1: The feature point of the database creation image includes a plurality of groups of feature points.

In case 1, the determining a matching feature point of the feature point of the to-be-processed image in step 3003 specifically includes the following steps.

3003*a*: Determine a target group of feature points from the plurality of groups of feature points based on a description manner of the descriptor of the feature point of the to-be-processed image.

3003*b*: Determine the matching feature point of the feature point of the to-be-processed image from the target group of feature points based on the descriptor of the feature point of the to-be-processed image.

The description manner of the descriptor of the feature point of the to-be-processed image is the same as a description manner of the target group of feature points. The foregoing plurality of groups of feature points may be obtained by using different types of feature extraction algorithms to perform feature extraction on the database creation image.

In this application, when the feature point of the database creation image includes the plurality of groups of feature points, the visual feature database includes more information about the feature point, and a target group of feature points whose description manner is the same as that of the descriptor of the feature point of the to-be-processed image is selected from the plurality of groups of feature points. A matching feature point that better matches the feature point of the to-be-processed image can be subsequently selected from the target group of feature points, thereby improving visual positioning effectiveness.

Case 2: The visual feature database includes a descriptor of the database creation image.

In case 2, the determining a matching feature point of the feature point of the to-be-processed image in step 3003 specifically includes the following steps.

3003*c*: Determine N images from the database creation image based on a descriptor of the to-be-processed image.

3003*d*: Determine the matching feature point of the feature point of the to-be-processed image from feature points of the N images.

The descriptor of the to-be-processed image is obtained by synthesizing the descriptor of the feature point of the to-be-processed image, a distance between the descriptor of the to-be-processed image and a descriptor of any one of the N images is less than or equal to a distance between the descriptor of the to-be-processed image and a descriptor of any one of remaining M images in the database creation image, and the database creation image includes N images and M images.

In this application, when the visual feature database includes the descriptor of the database creation image, N images whose descriptors are relatively close are first coarsely selected from the visual feature database based on the descriptor of the to-be-processed image, and then the matching feature point of the feature point of the to-be-processed image is determined from feature points of the N images, so that a visual positioning process can be accelerated, and visual positioning efficiency can be improved.

Case 3: The feature point of the database creation image is feature points of the plurality of types of scene images.

In case 3, the determining a matching feature point of the feature point of the to-be-processed image in step 3003 specifically includes the following steps.

3003*e*: Determine a target scene image from the plurality of types of scene images.

3003*f*: Determine the matching feature point of the feature point of the to-be-processed image from feature points of the target scene image based on the descriptor of the feature point of the to-be-processed image.

In the plurality of types of scene images shown in step 3003*e*, a scene corresponding to the target scene image is the closest to a scene when the to-be-processed image is photographed.

In this application, when the visual feature database includes the feature points of the plurality of types of scene images, the target scene image that is the closest to the scene when the to-be-processed image is photographed may be first determined from the plurality of types of scene images, and then the matching feature point of the feature point of the to-be-processed image is determined from the target scene image, so that a more accurate matching feature point can be determined for the feature point of the to-be-processed image, thereby improving a success rate of visual positioning.

Case 4: The visual feature database includes semantic information of the feature point of the database creation image and a confidence degree of the semantic information of the feature point of the database creation image.

In case 4, the determining posture information of a photographing unit when the photographing unit photographs the to-be-processed image in step 3004 specifically includes the following steps.

3004*a*: Perform weighting processing on the 3D position of the matching feature point based on the confidence degree of the semantic information of the matching feature point.

3004*b*: Determine, based on a weighting processing result, the posture information of the photographing unit when the photographing unit photographs the to-be-processed image.

In a process of performing weighting processing in step 3004*a*, a matching feature point with a higher confidence degree corresponds to a larger weight.

In this application, when the visual feature database includes the semantic information of the feature point of the database creation image and the confidence degree of the semantic information of the feature point of the database creation image, semantic information and confidence degrees corresponding to different feature points can be considered during visual positioning, to determine importance degrees of the different feature points during visual positioning, so that more precise visual positioning can be performed, and accuracy of visual positioning can be improved.

Figure 12:
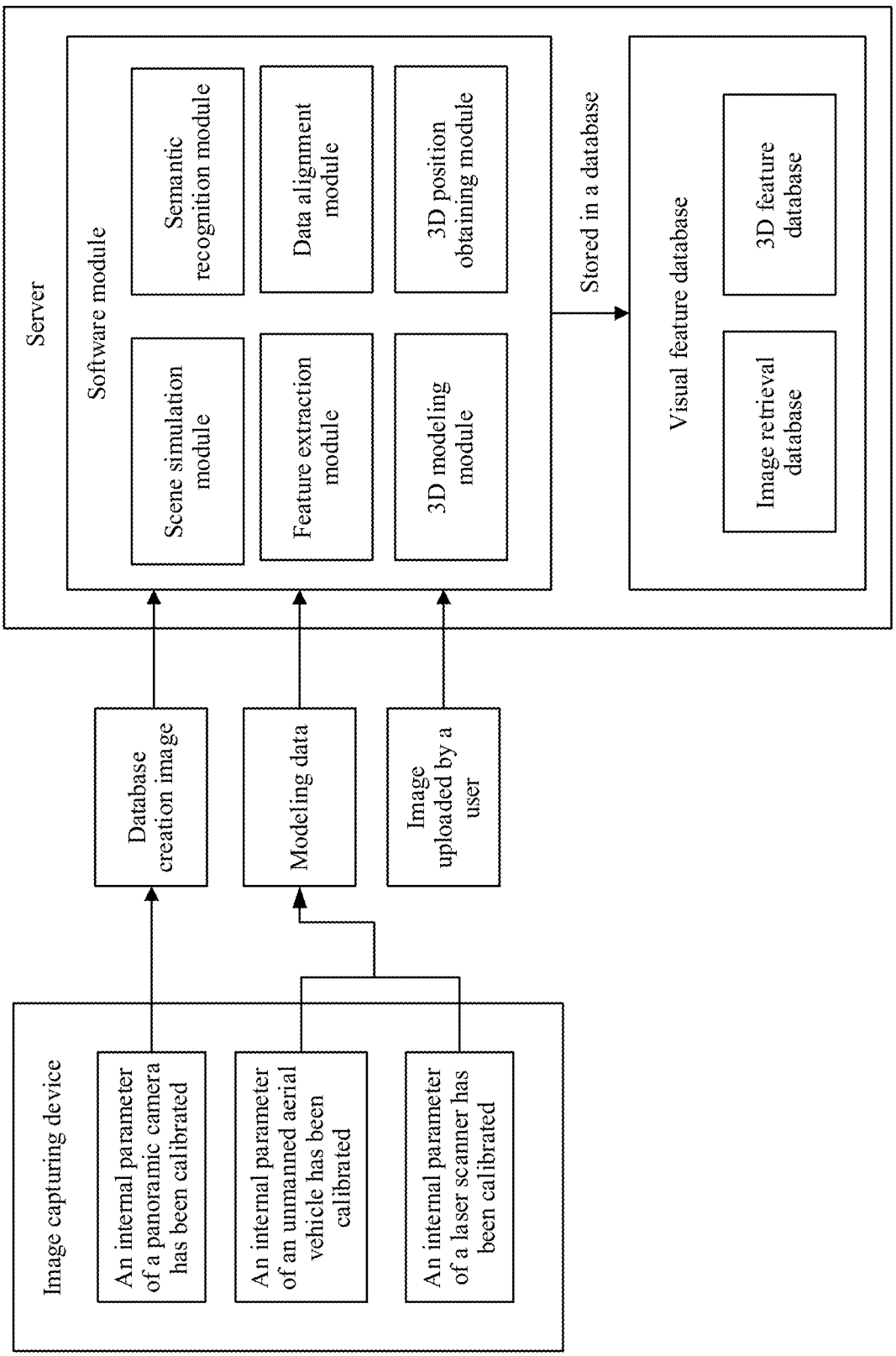
FIG. 12 is a schematic diagram of application of a visual feature database construction method to a specific product form according to an embodiment of this application.

FIG. 12 is a schematic diagram of application of a visual feature database construction method to a specific product form according to an embodiment of this application.

As shown in FIG. 12, photographing is performed by using a panoramic camera to obtain a database image, and modeling data is obtained by photographing using an unmanned aerial vehicle or by scanning using a laser scanner. Internal parameters of the panoramic camera, the unmanned aerial vehicle, and the laser scanner have been calibrated. In addition, in an outdoor scenario, the unmanned aerial vehicle may be used to obtain the modeling data, and in an indoor scenario, the laser scanner may be used to obtain the modeling data.

After the database creation image and the modeling data are obtained, the database creation image and the modeling data may be processed by using each module in a server, to finally obtain a 3D position of a feature point of the database creation image and a descriptor of the database creation image. Then, the descriptor of the database creation image is saved in an image retrieval database, and the 3D position of the feature point of the database creation image is saved in a 3D feature database.

When the database creation image and the modeling data are processed, the database creation image and the modeling data may be processed by using a software module in the server. Specifically, the modeling data includes a modeling image and point cloud data. Data alignment may be performed on the database creation image and the modeling image by using a data alignment module, and then 3D modeling is performed by using a 3D module in combination with the modeling data to obtain a 3D model. Semantic information of the feature point of the database creation image and a confidence degree of the semantic information of the feature point of the database creation image may be determined by using a semantic recognition module. Scene simulation may be performed on the database creation image by using a scene simulation module, to obtain scene images in a plurality of scenarios. Feature extraction may be performed on the database creation image by using a feature extraction module, to obtain the feature point of the database creation image and the descriptor of the feature point of the database creation image. The 3D position of the feature point of the database creation image may be determined by using a 3D position obtaining module.

The following describes an effect of the visual feature database construction method in this embodiment of this application with reference to a specific test result. Table 1 shows success rates of performing visual positioning by using visual feature database respectively constructed according to the existing solution and the solution of this application. As shown in Table 1, a first column is a visual feature database construction scheme. The conventional solution is a visual feature database construction scheme based on a structure from motion (SFM). The solution of this application is a visual feature database construction method in this embodiment of this application. A second column is a corresponding visual positioning scheme, including ORB positioning (a visual positioning scheme using an ORB feature extraction algorithm to perform feature extraction) and rootSIFT positioning (a visual positioning scheme using an SIFT feature extraction algorithm to perform feature extraction), and a third column indicates a success rate of visual positioning.

It can be learned from Table 1 that, regardless of whether ORB positioning or rootSIFT positioning is used, the success rate of performing visual positioning based on the visual feature database obtained in the solution of this application is higher than the success rate of performing visual positioning based on the visual feature database obtained in the conventional solution. When ORB positioning is used, a success rate of performing visual positioning based on the visual feature database obtained in the solution of this application is 93%, which is far greater than a success rate 61% of performing visual positioning based on the visual feature database obtained in the conventional solution. When rootSIFT positioning is used, the success rate of performing visual positioning based on the visual feature database obtained in the solution of this application is 98%, which is far greater than the success rate 71% of performing visual positioning based on the visual feature database obtained in the conventional solution.

TABLE 1

| Visual feature database construction scheme | Visual positioning scheme | Visual positioning success rate |
| --- | --- | --- |
| Conventional solution | ORB positioning | 61% |
| Solution of this application | ORB positioning | 93% |
| Conventional solution | rootSIFT positioning | 71% |
| Solution of this application | rootSIFT positioning | 98% |

The foregoing describes in detail the visual feature database construction method and the visual positioning method in the embodiments of this application with reference to the accompanying drawings. The following describes the visual feature database construction apparatus and the visual positioning apparatus in the embodiments of this application with reference to the accompanying drawings. It should be understood that the visual feature database construction apparatus described below can perform the visual feature database construction method in the embodiments of this application, and the visual positioning apparatus described below can perform the visual positioning method in the embodiments of this application. Repeated descriptions are appropriately omitted in the following description of the two apparatuses.

Figure 13:
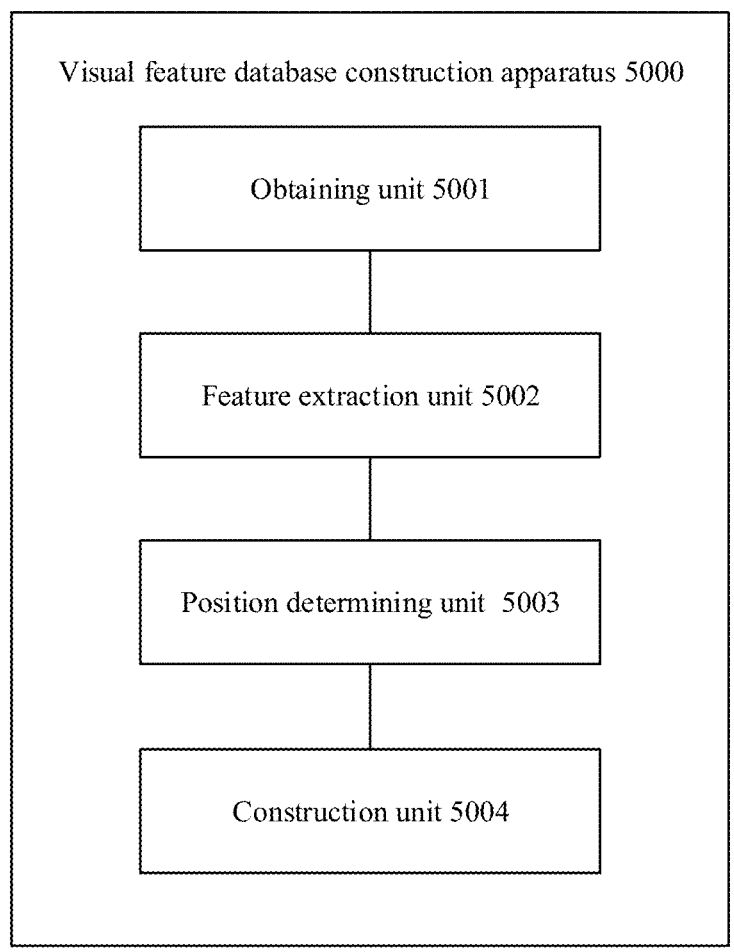
FIG. 13 is a schematic block diagram of a visual feature database construction apparatus according to an embodiment of this application.

FIG. 13 is a schematic block diagram of a visual feature database construction apparatus 5000 according to an embodiment of this application. The apparatus 5000 shown in FIG. 13 includes an obtaining unit 5001, a feature extraction unit 5002, a position determining unit 5003, and a construction unit 5004.

The apparatus 5000 shown in FIG. 13 may be specifically configured to perform the method shown in FIG. 1. Specifically, the obtaining unit 5001 is configured to perform step 1001, the feature extraction unit 5002 is configured to perform step 1002, the position determining unit 5003 is configured to perform step 1003, and the construction unit 5004 is configured to perform step 1004.

Figure 14:
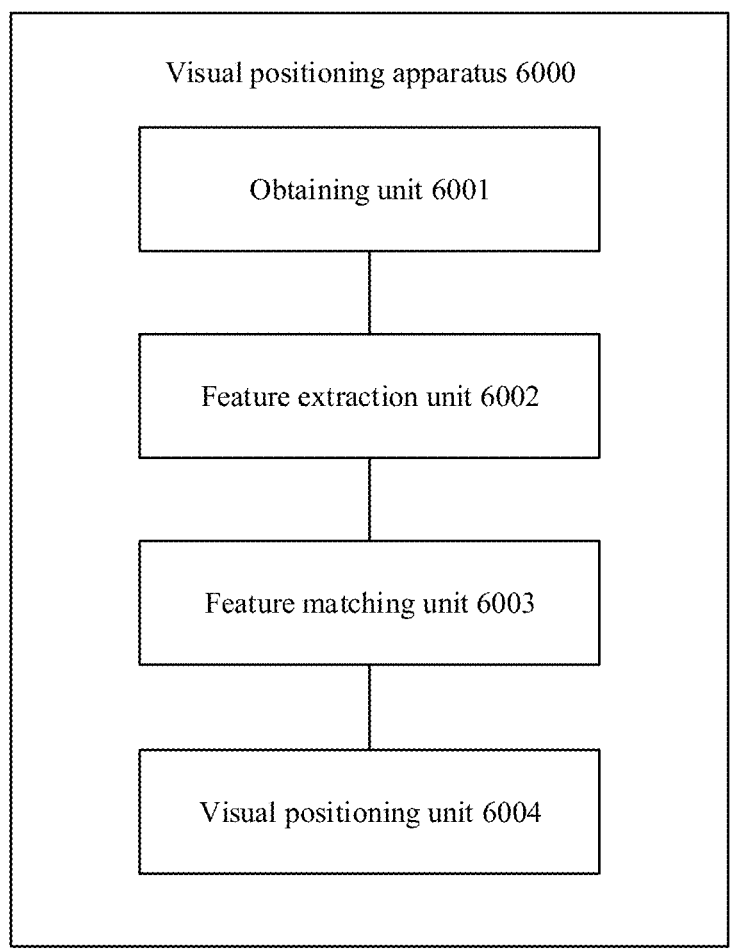
FIG. 14 is a schematic block diagram of a visual positioning apparatus according to an embodiment of this application.

FIG. 14 is a schematic block diagram of a visual positioning apparatus 6000 according to an embodiment of this application. The apparatus 6000 shown in FIG. 14 includes an obtaining unit 6001, a feature extraction unit 6002, a feature matching unit 6003, and a visual positioning unit 6004.

The apparatus 6000 shown in FIG. 14 may be specifically configured to perform the method shown in FIG. 11. Specifically, the obtaining unit 6001 is configured to perform step 3001, the feature extraction unit 6002 is configured to perform step 3002, the feature matching unit 6003 is configured to perform step 3003, and the visual positioning unit 6004 is configured to perform step 3004.

Figure 15:
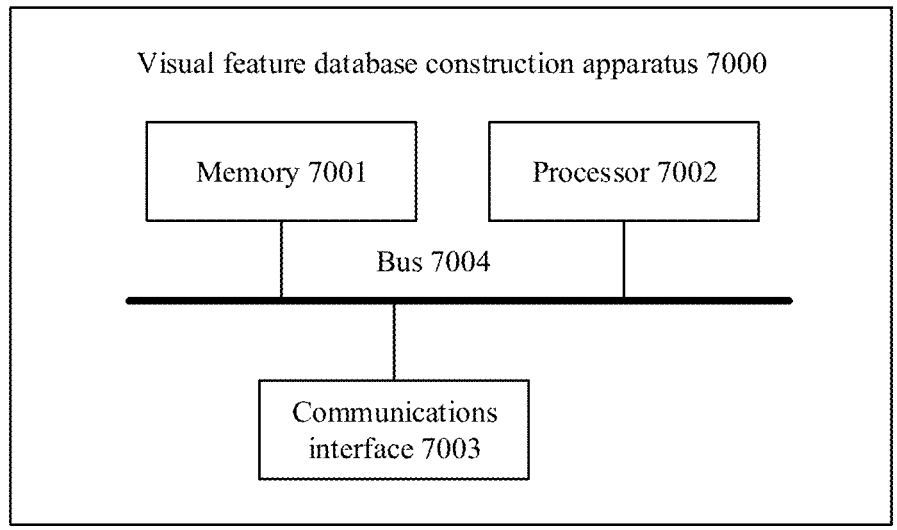
FIG. 15 is a schematic structural diagram of hardware of a visual feature database construction apparatus according to an embodiment of this application.

FIG. 15 is a schematic structural diagram of hardware of a visual feature database construction apparatus 7000 according to an embodiment of this application.

The visual feature database construction apparatus 7000 shown in FIG. 15 includes a memory 7001, a processor 7002, a communications interface 7003, and a bus 7004. Communication connections between the memory 7001, the processor 7002, and the communications interface 7003 are implemented through the bus 7004.

The processor 7002 may obtain a database creation image through (by invoking) the communications interface 7003 (the database creation image may be obtained from another apparatus through the communications interface), or obtain a database creation image from the memory 7001 (the database creation image is stored in the memory 7001). Then, the processor 7002 performs a series of processing on the database creation image, to finally construct a visual feature database.

The following describes in detail the modules and units in the apparatus 7000.

The memory 7001 may be a read-only memory (ROM), a static storage device, a dynamic storage device, or a random access memory (random access memory, RAM). The memory 7001 may store a program. When the program stored in the memory 7001 is executed by the processor 7002, the processor 7002 is configured to perform the steps of the visual feature database construction method in the embodiments of this application.

The processor 7002 may be a general-purpose central processing unit (CPU), a microprocessor, an application-specific integrated circuit (ASIC), a graphics processing unit (GPU), or one or more integrated circuits, and is configured to execute a related program, to implement the visual feature database construction method in the embodiments of this application.

The processor 7002 may alternatively be an integrated circuit chip and has a signal processing capability. In an implementation process, the steps of the visual feature database construction method in this application can be implemented by a hardware integrated logical circuit in the processor 7002, or by instructions in a form of software.

The processor 7002 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application.

The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 7001. The processor 7002 reads information in the memory 7001, and completes, in combination with hardware of the processor 7002, the function that needs to be performed by the unit of the visual feature database construction apparatus in the embodiments of this application, or perform the visual feature database construction method in the embodiments of this application.

The communications interface 7003 uses a transceiver apparatus, for example, but not limited to, a transceiver, to implement communication between the visual feature database construction apparatus 7000 and another device or a communications network. For example, information about a to-be-constructed neural network and training data required in a neural network construction process may be obtained through the communications interface 7003.

The bus 7004 may include a path for transmitting information between components (for example, the memory 7001, the processor 7002, and the communications interface 7003) of the visual feature database construction apparatus 7000.

The obtaining unit 5001 in the visual feature database construction apparatus 5000 may be equivalent to the communications interface 7003 in the visual feature database construction apparatus 7000, and is configured to obtain a database creation image.

The feature extraction unit 5002, the position determining unit 5003, and the construction unit 5004 in the visual feature database construction apparatus 5000 are equivalent to the processor 7002 in the visual feature database construction apparatus 7000, and are configured to perform a series of processing on the database creation image to finally construct a visual feature database.

Figure 16:
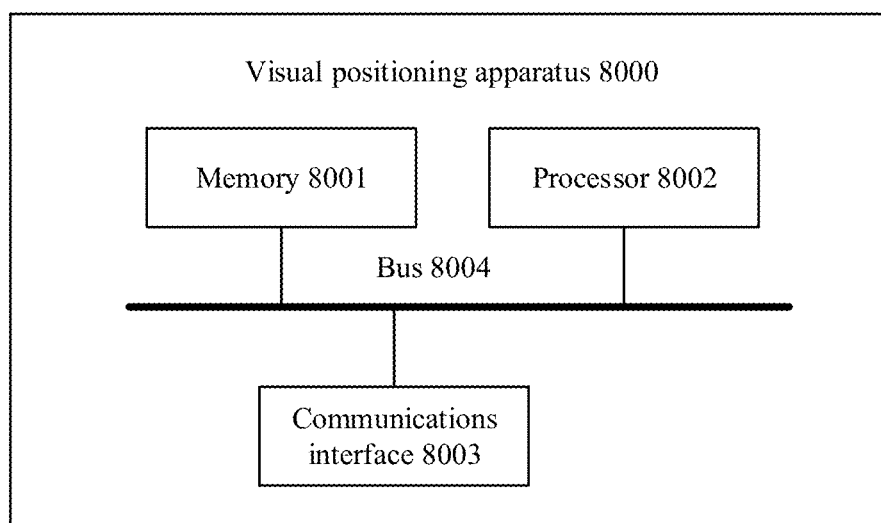
FIG. 16 is a schematic structural diagram of hardware of a visual positioning apparatus according to an embodiment of this application.

FIG. 16 is a schematic structural diagram of hardware of a visual positioning apparatus 8000 according to an embodiment of this application. The visual positioning apparatus 8000 shown in FIG. 16 includes a memory 8001, a processor 8002, a communications interface 8003, and a bus 8004. Communication connections between the memory 8001, the processor 8002, and the communications interface 8003 are implemented through the bus 8004.

The processor 8002 may obtain a to-be-processed image through (by invoking) a camera lens (not shown in FIG. 16), or obtain a to-be-processed image from the memory 8001.

Then, the processor 8002 performs a series of processing on the to-be-processed image, to finally implement visual positioning.

The foregoing definitions and explanations of the modules in the visual feature database construction apparatus 7000 are also applicable to the visual positioning apparatus 8000, and details are not described herein again.

The memory 8001 may be configured to store a program. The processor 8002 is configured to execute the program stored in the memory 8001. When the program stored in the memory 8001 is executed, the processor 8002 is configured to perform steps of the visual positioning method in the embodiments of this application.

The obtaining unit 6001 in the visual positioning construction apparatus 6000 may be equivalent to the communications interface 8003 in the visual positioning construction apparatus 8000, and is configured to obtain the to-be-processed image.

The feature extraction unit 6002, the feature matching unit 6003, and the visual positioning unit 6004 in the visual positioning apparatus 6000 are equivalent to the processor 8002 in the visual positioning apparatus 8000, and are configured to: after performing a series of processing on the to-be-processed image, determine posture information of a photographing unit when the photographing unit photographs the to-be-processed image.

The visual feature database construction apparatus 5000 shown in FIG. 13 and the visual feature database construction apparatus 7000 shown in FIG. 15 may be specifically a server, a cloud device, or a computer device that has a specific computing capability.

The visual positioning apparatus 6000 shown in FIG. 14 and the visual positioning apparatus 8000 shown in FIG. 16 may be specifically a mobile phone, a computer, a personal digital assistant, a wearable device, a vehicle-mounted device, an internet of things device, a virtual reality device, an augmented reality device, or the like.

The visual positioning method in the embodiments of this application may be performed by a terminal device. A structure of the terminal device is described in detail below with reference to FIG. 17.

Figure 17:
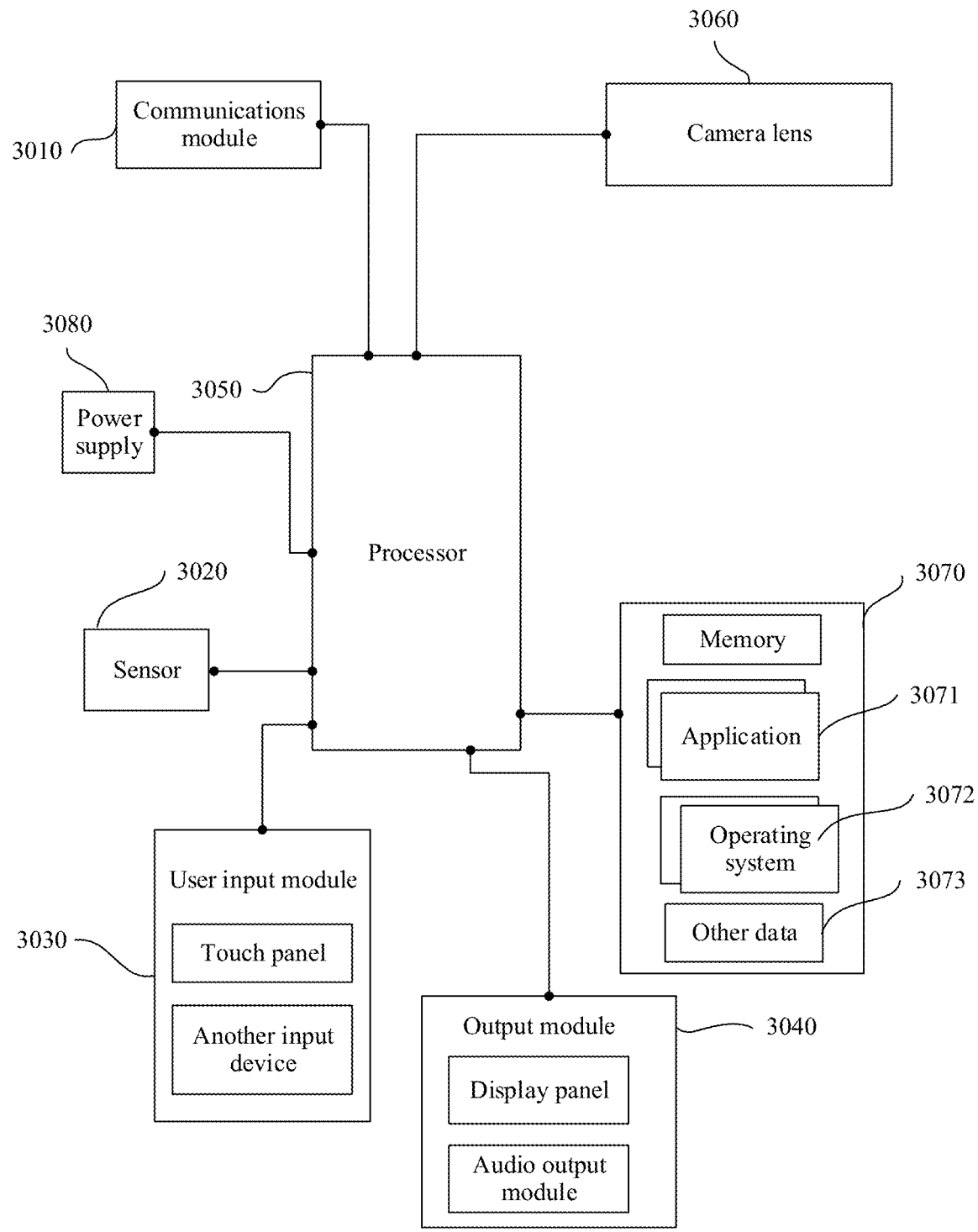
FIG. 17 is a schematic structural diagram of hardware of a terminal device according to an embodiment of this application.

FIG. 17 is a schematic structural diagram of hardware of a terminal device according to an embodiment of this application. The terminal device shown in FIG. 17 may perform the visual positioning method in the embodiments of this application.

The terminal device shown in FIG. 17 may perform steps of the visual positioning method shown in FIG. 3. Specifically, a camera lens 3060 may obtain a to-be-processed image (the camera lens may perform the step 3001), and then a processor processes the to-be-processed image to implement visual positioning (the processor may perform the steps 3002 to 3004).

The terminal device shown in FIG. 17 includes a communications module 3010, a sensor 3020, a user input module 3030, an output module 3040, a processor 3050, the camera lens 3060, a memory 3070, and a power supply 3080. The following describes these modules in detail.

The communications module 3010 may include at least one module that can enable the terminal device to communicate with another device (for example, a cloud device). For example, the communication module 3010 may include one or more of a wired network interface, a broadcast receiving module, a mobile communication module, a wireless internet module, a local area communication module, and a position (or positioning) information module.

The sensor 3020 may sense some operations of a user, and the sensor 3020 may include a distance sensor, a touch sensor, and the like. The sensor 3020 may sense an operation such as touching a screen or approaching a screen by the user.

The user input module 3030 is configured to: receive input digit information, character information, or a contact touch operation/contactless gesture, and receive signal input related to user setting and function control of the system. The user input module 3030 includes a touch panel and/or another input device.

The output module 3040 includes a display panel, configured to display information entered by the user, information provided for the user, various menu interfaces of the system, and the like. The output module 3040 may display a visual positioning result.

Optionally, the display panel may be configured in a form of a liquid crystal display (LCD), an organic light-emitting diode (OLED), or the like. In some other embodiments, the touch panel may cover the display panel, to form a touch display screen. In addition, the output module 3040 may further include an audio output module, an alarm, a tactile module, and the like.

The camera lens 3060 is configured to photograph an image, where the image photographed by the camera lens 3060 may be sent to the processor for visual positioning, and the processor processes the image photographed by the camera lens (a specific processing process may be shown in steps 3001 to 3004), to obtain posture information of the camera lens 3060 when the camera lens 3060 photographs the image.

The power supply 3080 may receive external power and internal power under control of the processor 3050, and provide power required for running the modules in the terminal device.

The processor 3050 may indicate one or more processors. For example, the processor 3050 may include one or more central processing units, one central processing unit and one graphics processing unit, or one application processor and a coprocessor (for example, a micro control unit or a neural network processor). When the processor 3050 includes a plurality of processors, the plurality of processors may be integrated into a same chip, or may be independent chips. One processor may include one or more physical cores, and the physical core is a minimum processing module.

The memory 3070 stores a computer program. The computer program includes an operating system program 3072, an application 3071, and the like. For example, a typical operating system is a system, such as Windows of Microsoft or MacOS of Apple, used for a desktop computer or a notebook computer; or a system, such as a Linux®-based Android® system developed by Google, used for a mobile terminal. When the visual feature database construction method in the embodiments of this application is implemented through software, it may be considered that the visual feature database construction method is specifically implemented by using the application program 3071.

The memory 3070 may be one or more of the following types: a flash (flash) memory, a memory of a hard disk type, a memory of a micro multimedia card type, a card-type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disc. In some other embodiments, the memory 3070 may be a network storage device on the internet. The system may perform an operation such as updating or reading on the memory 3070 on the internet.

The processor 3050 is configured to: read the computer program from the memory 3070, and then perform a method defined by the computer program. For example, the processor 3050 reads the operating system program 3072, to run an operating system in the system and implement various functions of the operating system, or reads one or more application programs 3071, to run an application in the system.

For example, the memory 3070 may store a computer program (the computer program is a program corresponding to the visual feature database construction method in the embodiments of this application). When the processor 3050 executes the computer program, the processor 3050 can perform the visual feature database construction method in the embodiments of this application.

The memory 3070 further stores data 3073 other than the computer program. For example, the memory 3070 may store a load characteristic of a frame drawing thread and a load predicted value of the frame drawing thread in the visual feature database construction method in this application.

A connection relationship between the modules in FIG. 17 is merely an example. The modules in FIG. 17 may alternatively be another connection relationship. For example, all modules in the terminal device are connected through a bus.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A visual feature database construction method, comprising:
    obtaining a database creation image;
    performing feature extraction on the database creation image, to obtain a feature point of the database creation image and a descriptor of the feature point of the database creation image;
    intersecting a ray corresponding to the feature point of the database creation image with a 3D model, to determine a 3D position of the feature point of the database creation image, wherein the 3D position of the feature point of the database creation image is a 3D position of an intersection point at which the ray corresponding to the feature point of the database creation image intersects with the 3D model, and the ray corresponding to the feature point of the database creation image is a ray that starts from a projection center of the database creation image and passes through the feature point of the database creation image; and
    constructing a visual feature database, wherein the visual feature database comprises the descriptor of the feature point of the database creation image and the 3D position of the feature point of the database creation image.

2. The construction method according to claim 1, wherein the performing feature extraction on the database creation image to obtain a feature point of the database creation image and a descriptor of the feature point of the database creation image comprises:
    performing feature extraction on the database creation image by using a plurality of types of feature extraction algorithms, to obtain the feature point of the database creation image and the descriptor of the feature point of the database creation image.

3. The construction method according to claim 1, wherein the visual feature database further comprises semantic information of the feature point of the database creation image and a confidence degree of the semantic information of the feature point of the database creation image, wherein the semantic information of the feature point of the database creation image is the same as semantic information of the region in which the feature point of the database creation image is located, the confidence degree of the semantic information of the feature point of the database creation image is the same as a confidence degree of the semantic information of the region in which the feature point of the database creation image is located, and semantic information of each region of the database creation image and a confidence degree of the semantic information of each region are obtained by performing semantic segmentation on the database creation image.

4. The construction method according to claim 1, wherein the visual feature database further comprises a descriptor of the database creation image, and the descriptor of the database creation image is obtained by synthesizing the descriptor of the feature point of the database creation image.

5. The construction method according to claim 1, wherein the performing feature extraction on the database creation image to obtain a feature point of the database creation image and a descriptor of the feature point of the database creation image comprises:
  performing scene simulation on the database creation image, to generate scene images in a plurality of scenarios, wherein the plurality of scenarios comprises at least two of daytime, night, rainy day, snowy day, and cloudy day; and
  performing feature extraction on the scene images in the plurality of scenarios, to obtain the feature point of the database creation image and the descriptor of the feature point of the database creation image.

6. The construction method according to claim 1, wherein the performing feature extraction on the database creation image to obtain a feature point of the database creation image and a descriptor of the feature point of the database creation image comprises:
  performing segmentation processing on the database creation image to obtain a plurality of slice images, wherein partial image content of adjacent slice images is the same in the plurality of slice images; and
  performing feature extraction on the plurality of slice images, to obtain the feature point of the database creation image and the descriptor of the feature point of the database creation image.

7. The construction method according to claim 1, wherein the method further comprises:
  receiving a to-be-processed image from user equipment;
  performing feature extraction on the to-be-processed image, to obtain a feature point of the to-be-processed image and a descriptor of the feature point of the to-be-processed image;
  intersecting a ray corresponding to the feature point of the to-be-processed image with the 3D model, to determine a 3D position of the feature point of the to-be-processed image, wherein the 3D position of the feature point of the to-be-processed image is a 3D position of an intersection point at which the ray corresponding to the feature point of the to-be-processed image intersects with the 3D model, the ray corresponding to the feature point of the to-be-processed image is a ray that starts from a projection center of the to-be-processed image and that passes through the feature point of the to-be-processed image, the to-be-processed image and the 3D model are located in a same coordinate system, and the projection center of the to-be-processed image is a position of a second photographing unit when the second photographing unit photographs the to-be-processed image; and
  updating the visual feature database, wherein the updated visual feature database comprises the feature point of the to-be-processed image and the 3D position of the feature point of the to-be-processed image.

8. The construction method according to claim 7, wherein before the updating the visual feature database, the method further comprises:
  determining that semantic information of the to-be-processed image is different from semantic information of a reference image, wherein the reference image is an image, in the visual feature database, that is closest to a position of the to-be-processed image.

9. The construction method according to claim 1, wherein the method further comprises:
  obtaining modeling data, wherein the modeling data comprises a modeling image and point cloud data;
  performing feature extraction on the modeling image to obtain a feature point of the modeling image;
  performing feature matching on feature points of any one image in the database creation image and any one image in the modeling image, and stringing matched feature points, to obtain a feature point sequence with a same name;
  performing adjustment processing on the database creation image and the modeling image according to the feature point sequence with the same name, to obtain a posture of the database creation image and a posture of the modeling image; and
  constructing the 3D model based on the posture of the modeling image and the point cloud data.

10. A visual positioning method, comprising:
  obtaining a to-be-processed image;
  performing feature extraction on the to-be-processed image, to obtain a feature point of the to-be-processed image and a descriptor of the feature point of the to-be-processed image;
  determining a matching feature point of the feature point of the to-be-processed image from a visual feature database based on the descriptor of the feature point of the to-be-processed image, wherein the visual feature database comprises a descriptor of a feature point of a database creation image and a 3D position of the feature point of the database creation image, and the visual feature database meets at least one of the following conditions:
  the feature point of the database creation image comprises a plurality of groups of feature points, and descriptors of any two of the plurality of groups of feature points have different description manners;
  the visual feature database comprises a descriptor of the database creation image, and the descriptor of the database creation image is obtained by synthesizing the descriptor of the feature point of the database creation image;
  the feature point of the database creation image is feature points of scene images in a plurality of scenarios, the scene images in the plurality of scenarios are obtained by performing scene simulation on the database creation image, and the plurality of scenarios comprises at least two of daytime, night, rainy day, snowy day, and cloudy day;
  the feature point of the database creation image and the descriptor of the feature point of the database creation image are obtained by performing feature extraction on a plurality of slice images, the plurality of slice images are obtained by performing segmentation processing on the database creation image, and partial image content of adjacent slice images is the same in the plurality of slice images;

the visual feature database comprises semantic information of the feature point of the database creation image and a confidence degree of the semantic information of the feature point of the database creation image; and determining, based on a 3D position of the matching feature point, posture information of a photographing unit when the photographing unit photographs the to-be-processed image.

11. The visual positioning method according to claim 10, wherein the feature point of the database creation image comprises the plurality of groups of feature points and the determining a matching feature point of the feature point of the to-be-processed image from a visual feature database based on the descriptor of the feature point of the to-be-processed image comprises:

determining a target group of feature points from the plurality of groups of feature points based on a description manner of the descriptor of the feature point of the to-be-processed image, wherein a description manner of the target group of feature points is the same as the description manner of the descriptor of the feature point of the to-be-processed image; and determining the matching feature point of the feature point of the to-be-processed image from the target group of feature points based on the descriptor of the feature point of the to-be-processed image.

12. The visual positioning method according to claim 10, wherein the visual feature database comprises the descriptor of the database creation image and the determining a matching feature point of the feature point of the to-be-processed image from a visual feature database based on the descriptor of the feature point of the to-be-processed image comprises:

determining N images from the database creation image based on a descriptor of the to-be-processed image, wherein the descriptor of the to-be-processed image is obtained by synthesizing the descriptor of the feature point of the to-be-processed image, a distance between the descriptor of the to-be-processed image and a descriptor of any one of the N images is less than or equal to a distance between the descriptor of the to-be-processed image and a descriptor of any one of remaining M images in the database creation image, and the database creation image comprises the N images and the M images; and determining the matching feature point of the feature point of the to-be-processed image from feature points of the N images.

13. The visual positioning method according to claim 10, wherein the feature point of the database creation image is the feature points of the scene images in the plurality of scenarios and the determining a matching feature point of the feature point of the to-be-processed image from a visual feature database based on the descriptor of the feature point of the to-be-processed image comprises:

determining a target scene image from the scene images in the plurality of scenarios, wherein in the scene images in the plurality of scenarios, a scene corresponding to the target scene image is closest to a scene when the to-be-processed image is photographed; and determining the matching feature point of the feature point of the to-be-processed image from feature points of the target scene image based on the descriptor of the feature point of the to-be-processed image.

14. The visual positioning method according to claim 10, wherein the visual feature database comprises the semantic information of the feature point of the database creation image and the confidence degree of the semantic information of the feature point of the database creation image and the determining, based on a 3D position of the matching feature point, posture information of a photographing unit when the photographing unit photographs the to-be-processed image comprises:

performing weighting processing on the 3D position of the matching feature point based on the confidence degree of the semantic information of the matching feature point, and determining, based on a weighting processing result, the posture information of the photographing unit when the photographing unit photographs the to-be-processed image, wherein the matching feature point with a higher confidence degree corresponds to a larger weight.

15. A visual feature database construction apparatus, comprising:

a memory, configured to store a program; and a processor, configured to execute the program stored in the memory, wherein when the program stored in the memory is executed by the processor, the processor performs:

obtaining a database creation image;

performing feature extraction on the database creation image, to obtain a feature point of the database creation image and a descriptor of the feature point of the database creation image;

intersecting a ray corresponding to the feature point of the database creation image with a 3D model, to determine a 3D position of the feature point of the database creation image, wherein the 3D position of the feature point of the database creation image is a 3D position of an intersection point at which the ray corresponding to the feature point of the database creation image intersects with the 3D model, and the ray corresponding to the feature point of the database creation image is a ray that starts from a projection center of the database creation image and passes through the feature point of the database creation image; and constructing the visual feature database, wherein the visual feature database comprises the descriptor of the feature point of the database creation image and the 3D position of the feature point of the database creation image.

16. The visual feature database construction apparatus according to claim 15, wherein the performing feature extraction on the database creation image to obtain a feature point of the database creation image and a descriptor of the feature point of the database creation image comprises:

performing feature extraction on the database creation image by using a plurality of types of feature extraction algorithms to obtain the feature point of the database creation image and the descriptor of the feature point of the database creation image.

17. The visual feature database construction apparatus according to claim 15, wherein the visual feature database further comprises semantic information of the feature point of the database creation image and a confidence degree of the semantic information of the feature point of the database creation image, and wherein the semantic information of the feature point of the database creation image is the same as semantic information of a region in which the feature point of the database creation image is located, the confidence degree of the semantic information of the feature point of the database creation image is the same as a confidence degree of the semantic information of the region in which the feature point of the database creation image is located, and semantic information of each region of the database creation image and a confidence degree of the semantic information of each region are obtained by performing semantic segmentation on the database creation image.

18. A visual positioning apparatus, comprising:
a memory, configured to store a program; and
a processor, configured to execute the program stored in the memory, wherein when the program stored in the memory is executed by the processor, the processor performs:
obtaining a to-be-processed image;
performing feature extraction on the to-be-processed image, to obtain a feature point of the to-be-processed image and a descriptor of the feature point of the to-be-processed image;
determining a matching feature point of the feature point of the to-be-processed image from a visual feature database based on the descriptor of the feature point of the to-be-processed image, wherein the visual feature database comprises a descriptor of a feature point of a database creation image and a 3D position of the feature point of the database creation image, and the visual feature database meets at least one of the following conditions:
  the feature point of the database creation image comprises a plurality of groups of feature points, and descriptors of any two of the plurality of groups of feature points have different description manners;
  the visual feature database comprises a descriptor of the database creation image, and the descriptor of the database creation image is obtained by synthesizing the descriptor of the feature point of the database creation image;
  the feature point of the database creation image is feature points of scene images in a plurality of scenarios, the scene images in the plurality of scenarios are obtained by performing scene simulation on the database creation image, and the plurality of scenarios comprises at least two of daytime, night, rainy day, snowy day, and cloudy day;
  the feature point of the database creation image and the descriptor of the feature point of the database creation image are obtained by performing feature extraction on a plurality of slice images, the plurality of slice images are obtained by performing segmentation processing on the database creation image, and partial image content of adjacent slice images is the same in the plurality of slice images;
  the visual feature database comprises semantic information of the feature point of the database creation image and a confidence degree of the semantic information of the feature point of the database creation image; and
determining, based on a 3D position of the matching feature point, posture information of a photographing unit when the photographing unit photographs the to-be-processed image.

19. The visual positioning apparatus according to claim 18, wherein the feature point of the database creation image comprises the plurality of groups of feature points and the determining a matching feature point of the feature point of the to-be-processed image from a visual feature database based on the descriptor of the feature point of the to-be-processed image comprises:
  determining a target group of feature points from the plurality of groups of feature points based on a description manner of the descriptor of the feature point of the to-be-processed image, wherein a description manner of the target group of feature points is the same as the description manner of the descriptor of the feature point of the to-be-processed image; and
  determining the matching feature point of the feature point of the to-be-processed image from the target group of feature points based on the descriptor of the feature point of the to-be-processed image.

20. The visual positioning apparatus according to claim 18, wherein the visual feature database comprises the descriptor of the database creation image and the determining a matching feature point of the feature point of the to-be-processed image from a visual feature database based on the descriptor of the feature point of the to-be-processed image comprises:
  determining N images from the database creation image based on a descriptor of the to-be-processed image, wherein the descriptor of the to-be-processed image is obtained by synthesizing the descriptor of the feature point of the to-be-processed image, a distance between the descriptor of the to-be-processed image and a descriptor of any one of the N images is less than or equal to a distance between the descriptor of the to-be-processed image and a descriptor of any one of remaining M images in the database creation image, and the database creation image comprises the N images and the M images; and
  determining the matching feature point of the feature point of the to-be-processed image from feature points of the N images.

* * * * *